(12) United States Patent
Nakagawa et al.

(10) Patent No.: US 6,278,194 B1
(45) Date of Patent: Aug. 21, 2001

(54) STATOR GENERATOR FOR AN INTERNAL COMBUSTION ENGINE

(75) Inventors: Masanori Nakagawa; Yutaka Inaba, both of Numazu (JP)

(73) Assignee: Kokusan Denki Co., Ltd., Numazu (JP)

(*) Notice: Subject to any disclaimer, the term of this patent is extended or adjusted under 35 U.S.C. 154(b) by 0 days.

(21) Appl. No.: 09/479,334

(22) Filed: Jan. 7, 2000

(30) Foreign Application Priority Data

Jan. 11, 1999 (JP) .................................. 11-004410

(51) Int. Cl.$^7$ .................................. H02P 9/08; H02P 1/00
(52) U.S. Cl. .................................. 290/31; 290/32; 322/46; 310/113; 310/114
(58) Field of Search .................................. 290/30 R, 31, 290/32, 36 R, 38 R; 322/24, 10, 11, 39, 45, 46; 310/113, 114

(56) References Cited

U.S. PATENT DOCUMENTS

| | | | |
|---|---|---|---|
| 4,948,997 | * 8/1990 | Ohmitsu et al. | 310/113 |
| 5,001,412 | 3/1991 | Carter et al. | 322/10 |
| 5,550,457 | * 8/1996 | Kusase et al. | 322/29 |
| 5,663,631 | * 9/1997 | Kajiura et al. | 322/29 |
| 5,753,989 | * 5/1998 | Syverson | 310/114 |
| 5,880,533 | * 3/1999 | Arai et al. | 290/31 |
| 5,900,722 | * 5/1999 | Scott et al. | 322/46 |
| 5,929,611 | * 7/1999 | Scott et al. | 322/46 |
| 5,998,901 | * 12/1999 | Kawabata et al. | 310/114 |

FOREIGN PATENT DOCUMENTS 58-63085  4/1983 (JP).
11-46456  2/1999 (JP).

* cited by examiner

*Primary Examiner*—Nicholas Ponomarenko
(74) *Attorney, Agent, or Firm*—Pearne & Gordon LLP

(57) ABSTRACT

A stator generator for an internal combustion engine comprising a magnet rotor provided on an output shaft of the engine and having main poles of permanent magnet and interpoles of material of high permeability alternately provided thereon whereby it is operated as an electric motor when the engine starts so that a drive current flows through armature coils with each of the main poles and one of the interpoles on the advanced side of the corresponding main pole serving as one rotor pole and it is operated as a magneto generator after the engine starts so that a control current flows through the armature coils so as to generate an output for charging a battery with each of the main poles and one of the interpoles on the delayed side of the corresponding main pole serving as one rotor pole.

4 Claims, 13 Drawing Sheets

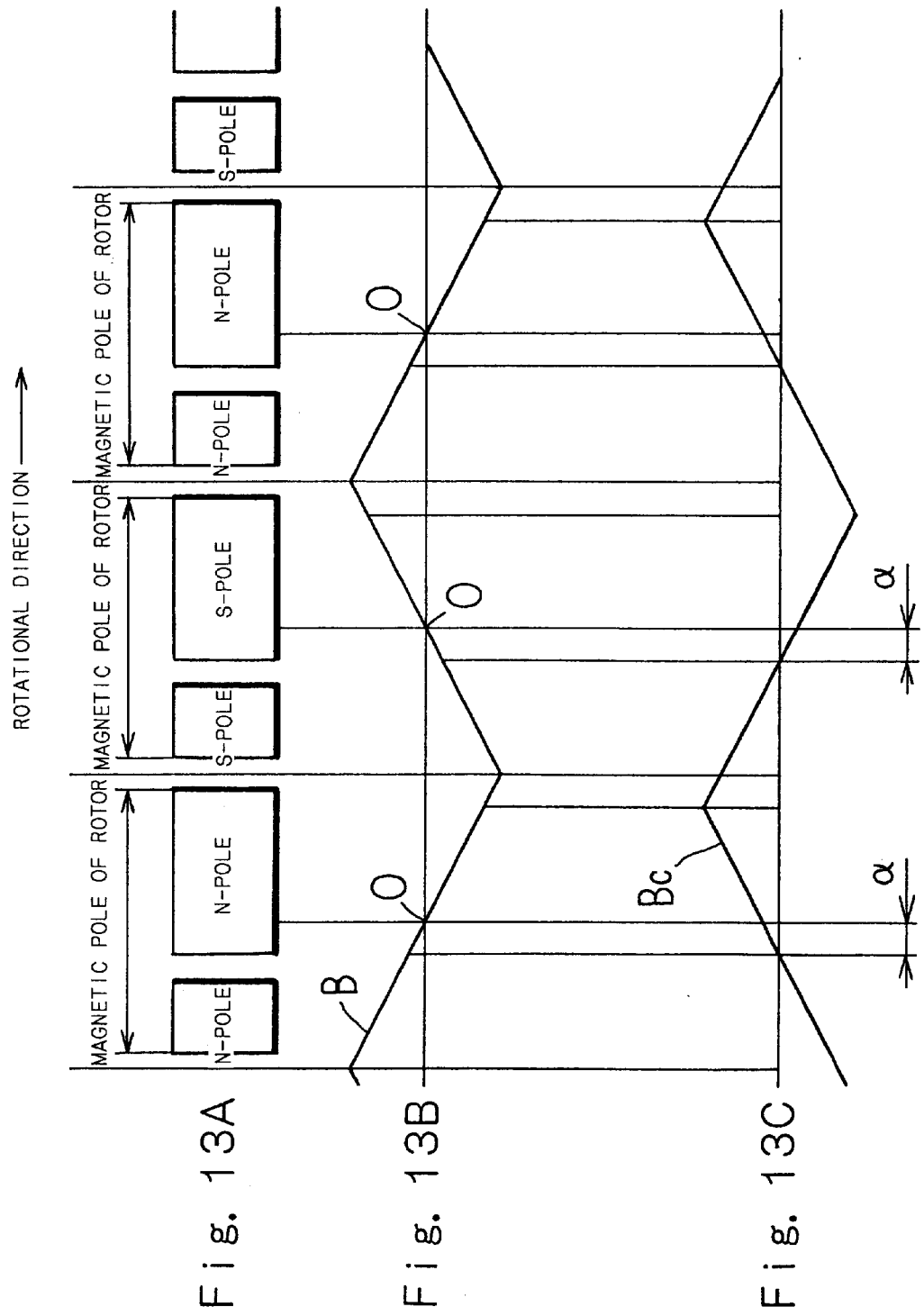

STATOR GENERATOR FOR AN INTERNAL COMBUSTION ENGINE

TECHNICAL FIELD OF THE INVENTION

This invention pertains to a stator generator for an internal combustion engine or an engine starting motor and generator apparatus adapted to be operated as an electric motor when the engine starts and to be operated as a magneto generator after the engine starts.

BACKGROUND OF THE INVENTION

An internal combustion engine has a magneto generator provided for driving various electrical equipment loads provided in the engine. The magneto generator for the internal combustion engine generally used comprises a flywheel magnet rotor provided on a crank shaft of the engine and a stator having armature coils wound on an armature core. The stator includes an igniting generator coil for driving an ignition system for the internal combustion engine, generator coils for driving a fuel injection device, generator coils for driving electrical equipment loads necessary for operating the engine and generator coils for supplying electric power to lamp loads, a battery and so on.

A ring gear is securely provided on an outer periphery of a peripheral wall of the flywheel magnet rotor and an engine starter motor is provided on an engine case. On an output shaft of the starter motor is provided a pinion gear, which is forwardly moved when the starter motor is driven so as to be meshed with the ring gear whereby the flywheel magnet rotor rotates together with the crank shaft.

As the magnet rotor rotates, the igniting generator coil on the stator has a voltage induced there across and therefore the ignition system for the internal combustion engine ignites and starts the engine.

As noted from the foregoing, the conventional internal combustion engine disadvantageously has a complicated construction because of the ring gear provided on the flywheel for starting the engine as well as the starter motor provided therein.

As disclosed in JP58-63085, a magnet generator provided on a crank shaft of an internal combustion engine has been proposed which is used for a starter generator, but is also operated as a brushless DC motor when the engine starts whereby a peculiar starter motor is omitted.

However, since the starter motor and the magnet generator for charging a battery have different winding specifications necessary for meeting their characteristics, such an idea as one rotary electric machine having a magnet rotor and multi-phase armature coils is operated as the brushless DC motor and also as the battery charging magnet generator has not been practically used.

SUMMARY OF THE INVENTION

Accordingly, it is a principal object of the invention to provide a starter generator for an internal combustion engine serving as a starter motor when the engine starts so as to provide a high torque necessary for starting the engine and as a magnet generator after the engine starts so as to provide a high output even though the engine still rotates at low speed.

In accordance with the present invention, there is provided a starter generator for an internal combustion engine comprising a rotary electric machine including a magnet rotor having a magnet field of $2m$ ($m$ is an integral number of more than one) rotor magnetic poles and a stator having an armature core with a plurality of teeth arranged in a peripheral direction and $n$ ($n$ is an integral number of more than two) phase armature coils of coil groups wound on the teeth of the armature core and connected to each other so as to form an $n$ phase circuit so that leading ends of the teeth of the armature core form stator magnetic poles facing the rotor magnetic poles; an inverter circuit to control a current flowing through the armature coils of the rotary electric machine; and an inverter controller to control the inverter circuit whereby the rotary electric machine is operated as an electric motor when the engine starts so as to rotate the magnet rotor in a direction in which the engine starts and the rotary electric machine is operated as a magneto generator after the engine starts so as to flow a charging current to a battery via a full-wave rectifier circuit by an induction voltage induced in the $n$ phase armature coils.

The inverter circuit used for the starter generator of the invention comprises a switch circuit of $2n$ on-off controllable switch elements connected to each other in an $n$ phase bridge form and an $n$ phase diode bridge full-wave rectifier circuit formed of $2n$ diodes connected to the $2n$ switch elements in a reversely parallel manner. A pair of DC side terminals of the full-wave rectifier circuit are connected to both terminals of the battery while $n$ AC side terminals of the full-wave rectifier circuit are connected to $n$ terminals led out from the $n$ phase armature coils, respectively.

The inverter controller serves to control the switch elements of the inverter circuit so that a drive current flows from the battery via the switch elements of the inverter circuit while it is transferred to the $n$ phase armature coils in a predetermined phase sequence.

In this invention, the magnetic field of the magnet rotor comprises main poles formed of $2m$ circular arc-shaped permanent magnets having a predetermined polar arc angle and $2m$ interpoles having a polar arc angle smaller than the polar arc angle of the main poles and formed of circular arc-shaped magnetic material having a permeability higher than the permanent magnets of the main poles, both of which are alternately arranged in a peripheral direction so that each one of the interpoles is disposed on both sides of the respective main poles.

The inverter controller is so formed as to control the inverter as herein just below mentioned when the rotary electric machine is operated as the motor or as the magneto generator.

More particularly, the inverter controller serves to control the switch elements of the inverter circuit so that when the internal combustion engine starts, each of the main poles and adjacent one of the interpoles located on the side advanced relative to the one main pole in a rotational direction of the magnet rotor serve as one rotor pole for the motor whereby a drive current flows from the battery through the $n$ phase armature coils via the inverter circuit in a predetermined phase sequence while an excitation phase of the armature coils is switched at a motor standard excitation phase switch position set so as to have a relationship of a geometrical center position of the magnetic poles of the rotor for the motor and a geometrical center position of the stator magnetic poles at leading ends of the teeth of the armature core on which the respective phase armature coils are wound set relative to each other or at a motor excitation phase switch position having a predetermined control phase angle relative to the motor standard excitation phase switch position so as to rotate the magnet rotor in a direction in which the engine starts.

The inverter controller also serves to control the switch elements of the inverter circuit so that after the internal combustion engine starts, each of the main poles and adjacent one of the interpoles located on the side delayed relative to the one main pole in a rotational direction of the magnet rotor serve as one rotor pole for the generator whereby a control current flows from the battery through the n phase armature coils via the inverter circuit in a predetermined phase sequence at a generator standard excitation phase switch position set so as to have a relationship of a geometrical center position of the magnetic pole of the rotor for the generators and a geometrical center position of the stator magnetic poles at leading ends of the teeth of the armature core on which respective phase armature coils are wound set relative to each other or at a generator excitation phase switch position having a predetermined control phase angle relative to the generator standard excitation phase switch position.

The aforementioned inverter controller may comprise position detection means to detect a rotary angle position of the rotor for switching the excitation phase of the armature coils and switch control means to control the switch elements of the inverter circuit based on a timing detected by the position detection means.

When the rotary electric machine should be operated as the motor, the position detection means detects as the motor standard excitation phase switch position a position having the relationship of the geometrical center position of the rotor magnetic poles for the motor and the geometrical center position of the stator magnetic poles at the leading ends of the teeth of the armature core on which the respective phase armature coils are wound set relative to each other with each of the main poles and adjacent one of the interpoles located on the side of the magnet rotor advanced relative to the one main pole in the rotational direction of the magnet rotor serving as one rotor pole for the motor.

When the rotary electric machine should be operated as the magneto generator, the position detection means detects as the generator standard excitation phase switch position a position having the relationship of the geometrical center position of the rotor magnetic poles for the generator and the geometrical center position of the stator magnetic poles at the leading ends of the teeth of the armature core on which the respective phase armature coils are wound set relative to each other with each of the main poles and adjacent one of the interpoles located on the side of the magnet rotor advanced relative to the one main pole in the rotational direction of the magnet rotor serving as one rotor pole for the generator.

In this manner, the position detection means serves to generate a motor position detection signal for each phase including informations on the motor standard excitation phase switch position and a generator position detection signal for each phase including informations on the generator standard excitation phase switch position.

When the internal combustion engine starts, the switch controller gives a drive signal to the predetermined switch elements of the inverter circuit at the motor standard excitation phase switch position detected by the phase motor position detection signal or at the motor excitation phase switch position having the predetermined control phase angle relative to the aforementioned motor standard excitation phase switch position so that the drive current flows from the battery via the predetermined switch element through the armature coils.

After the engine starts, the switch controller gives a drive signal to the predetermined switch elements of the inverter circuit at the generator excitation phase switch position having the predetermined control phase angle relative to the generator standard excitation phase switch position detected by the phase generator position detection signal so as to provide a predetermined characteristic of output voltage to output current of the armature coils.

The aforementioned inverter controller serves to adjust the control phase angle in accordance with the magnitude of the load driven by the rotary electric machine whereby when the output of the rotary electric machine operating as the magneto generator should increase, the generator excitation phase switch position delayed relative to the generator standard excitation phase switch position is so set as to increase a magnetic flux passing through the interpole portion of the magnetic poles of the rotor for the generator and when the output of the rotary electric machine operating as the magneto generator should decrease, the generator excitation phase switch position advanced relative to the generator standard excitation phase switch position is so set as to increase the magnetic flux passing through the interpole portion of the magnetic poles of the rotor for the generator.

The aforementioned position detection means may be provided so as to rotate together with the magnet rotor and may comprise a position detection magnet magnetized so as to have magnetic poles corresponding to the magnetic poles of the rotor for the motor, magnet sensors for each phase generating the motor position detection signal of each phase by detecting the magnetic poles of the position detection magnets and generator position detection signal generation means to generate the generator position detection signal of each phase by delaying the phase of the motor position detection signal from the phase magnet sensors by predetermined angle.

The aforementioned position detection means may be also provided so as to rotate together with the magnet rotor and may comprise a position detection magnet magnetized so as to have magnetic poles corresponding to the magnetic poles of the rotor for the generator, magnet sensors for each phase generating the generator position detection signal of each phase by detecting the magnetic poles of the position detection magnets and motor position detection signal generation means to generate the motor position detection signal of each phase by delaying the phase of the motor position detection signal from the phase magnet sensors by predetermined angle.

Alternatively, the aforementioned position detection means may be also provided so as to rotate together with the magnet rotor and may comprise a position detection magnet magnetized so as to have magnetic poles corresponding to the magnetic poles of the rotor for the motor or the magnetic poles of the rotor for the generator, motor magnet sensors for each phase generating the motor position detection signal of each phase by detecting the magnetic poles of the position detection magnets and generator magnet sensors for each phase generating the generator position detection signal of each phase by detecting the magnetic poles of the position detection magnets.

The starter generator of the invention may be in the form of outer rotor type generator in which a magnet rotor rotates outside of a stator or in the form of inner rotor type generator in which a magnet rotor rotates inside of a stator.

In general, since the internal combustion engine has a flywheel mounted thereon, the magnet rotor may be constructed in a compact manner by utilizing the flywheel therefor. In this case, a cup-like flywheel which has a peripheral wall, a bottom wall closing the peripheral wall at one end thereof and a hub provided on the bottom wall at its center may be preferably used for the magnet rotor so that the main poles and the interpoles are mounted on an inner face of the peripheral wall of the flywheel.

The stator may be disposed inside of the rotor and comprise a multi-pole star-like armature core having a construction of many radial teeth protruding from an annular yoke and n (n is an integral number of more than 2) phase armature coils having coil groups wound around the teeth of the armature core and connected to form an n phase circuit.

With a conventional magneto generator having magnetic poles of magnet field of a rotor formed of only permanent magnet operated as a brushless DC motor, an armature reaction magnetomotive force caused by an armature current flowing through the armature coils causes an advanced area of the magnetic poles of the rotor to be subject to magnetization action and a delayed area thereof to be subject to demagnetization action. Since a quantity of magnetic flux increasing on the advanced area is equal to that on the delayed area, there is no variation in the quantity of the magnetic flux flowing through the whole magnetic poles of the rotor even though the armature current varies.

On the other hand, with the respective magnetic poles of the magnetic field for the rotor formed of the main poles of permanent magnet and the interpoles of high permeability material in accordance with the invention, the armature reaction magnetomotive force caused by the armature current flowing through the armature coils magnetizes the interpoles positioned on the advanced side relative to the main poles in a rotational direction with the same polarity.

Thus, it will be noted that with the rotary electric machine having the main poles and the interpoles alternatively provided operated as the motor, the respective main poles and the adjacent interpoles positioned on the advanced side relative to the corresponding main poles function as a rotor magnetic pole of the same polarity. In other words, the respective rotor magnetic poles are constituted by the respective main poles and the adjacent interpoles on the advanced side thereof.

Although the original quantity of magnetic flux generated by the respective rotor magnetic poles decreases due to decrease in magnet in comparison with the whole magnetic poles formed of permanent magnet, the armature reaction magnetomotive force causes the magnetic flux flowing through the interpoles to increase and as a result, more magnetic flux flows through rotor magnetic poles in comparison with the whole magnetic poles formed of permanent magnet if predetermined conditions are met.

As the rotary electric machine having the main poles and the interpoles is operated as the brushless DC motor, the quantity of magnetic flux varies in accordance with the excitation phase switch position which switches the excitation phase of the n phase armature coils.

With the motor standard excitation phase switch position being set at a position where the geometrical center position (the center position of the peripheral direction) of the respective rotor magnetic poles is identical to the geometrical center position of the stator magnetic poles at the leading ends of the teeth of the armature core on which the armature coils for each phase are wound, as an angle (the control phase angle) α between the standard excitation phase switch position and the excitation phase switch position increases in the advance direction, the quantity of magnetic flux generated from the rotor magnetic poles decreases as a whole or that the magnet field is demagnetized so that an output torque of the motor is lowered. On the other hand, as the control phase angle α increases in the delay direction, the quantity of magnetic flux increases or the magnet field is further magnetized so that the output torque of the motor is improved.

Thus, with the rotary electric machine having the interpoles operated as the brushless DC motor, the control phase angle α can be properly adjusted so that it varies in the delay direction whereby the output torque of the motor enough for starting the engine can be obtained. In this manner, it will be noted that the engine can start without any trouble.

As noted from the foregoing, with the rotary electric machine having the interpoles operated as the brushless DC motor, since the obtained output torque can be higher than that from a brushless DC motor having the whole rotor magnetic poles formed of permanent magnet with the same size, the rotary electric machine can serve as the starter motor for the internal combustion engine without any large size.

With the rotary electric machine operated as the magneto generator without any change in the rotational direction of the rotor, since the armature current flows in a direction reverse to that in case of being operated as the motor, the adjacent interpoles positioned in the delay side relative to the corresponding main poles in the rotational direction is magnetized by the armature reaction magnetomotive force with the same polarity. Thus, after the internal combustion engine starts, when the rotary electric machine is operated as the magneto generator, each of the main poles and the adjacent interpoles positioned on the delay side in the rotational direction constitute respective one rotor magnetic pole.

With the generator standard excitation phase switch position being set at a position where the center position of the peripheral direction of each of the rotor magnetic poles is identical to the center position of peripheral direction of the armature core at the leading ends of the teeth thereof on which the armature coils for each phase are wound, as an angle (a control phase angle) α between the generator standard excitation phase switch position and the actual excitation phase switch position varies on the advance side in the rotational direction, the quantity of magnetic flux generated from the rotor magnetic poles decreases as a whole or the magnet field is demagnetized so that an output of the magneto generator is lowered. On the other hand, as the control phase angle α varies on the delay side in the rotational direction, the quantity of magnetic flux increases or the magnet field is further magnetized so that the output of the magneto generator increases.

Thus, as the rotary electric machine having the interpoles is operated as the magneto generator, as the switch element is on-off controlled with the position advanced by the predetermined control phase α relative to the standard excitation phase switch position being set as the excitation phase switch position, the output of the magneto generator can increase by further magnetizing each of the rotor magnet poles, which is caused by the armature reaction magnetomotive force generated by the current flowing from the battery via the inverter circuit through the armature coils.

Thus, even though the rotary electric machine has the armature coils wound so as to have a low resistance and a low inductance whereby it also serves as the starter motor, the rotary electric machine operated as the magneto generator can generate a fully higher output. In this manner, the magneto generator can supply a charging current even though the engine rotates at low speed or from the range of low revolution of the engine.

In the foregoing description, although the standard excitation phase switch position is set at the position where the geometrical center position of the respective rotor magnetic poles is identical to the geometrical center position of the stator magnetic poles at the leading ends of the teeth of the armature core, it may not be determined in this manner and it may be set at a position where the geometrical center position of the respective rotor magnetic poles and the geometrical center position of the stator magnetic poles at the leading ends of the teeth of the armature core are set at a position having the relationship thereof set in a predetermined manner.

In order to more easily control the rotary electric machine, a border position between an area which is further magnetized by the armature reaction magnetomotive force and an area which is demagnetized thereby is preferably set as the standard excitation phase switch position.

With the interpoles of high permeability material provided on the magnetic field as in the rotary electric machine used for the invention, since the portion of the interpoles is more affected by the armature reaction magnetomotive force than the portion of the magnet or the main poles, the border position between the area which is further magnetized by the armature reaction magnetomotive force and the area which is demagnetized thereby is located at the position closer to the interpoles than the position where the center position of the peripheral direction of each of the rotor magnetic poles is identical to the center position of peripheral direction of the armature core at the leading ends of the teeth thereof.

BRIEF DESCRIPTION OF THE DRAWING

The above and other objects and features of the invention will be apparent from the description of the embodiments of the invention taken along with reference to the accompanying drawings in which;

FIG. 13 illustrates the armature reaction magnetomotive force and the controlling magnetomotive force when the starter generator of FIG. 1 is operated as the generator;

DETAILED DESCRIPTION OF EMBODIMENTS OF THE INVENTION

Figure 1:
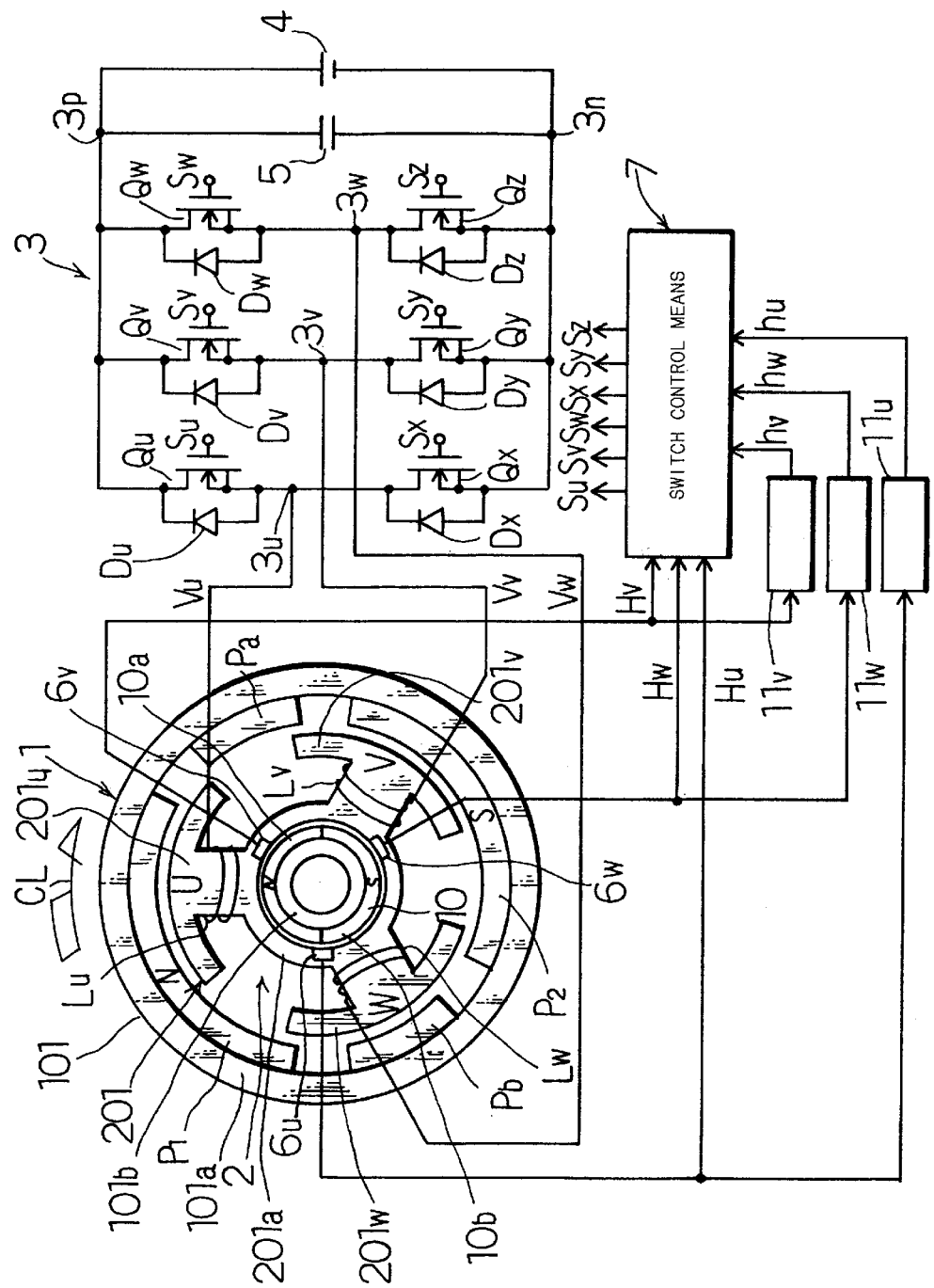
FIG. 1 is an schematic diagram of a starter generator constructed in accordance with one embodiment of the invention.

Referring to FIG. 1, there is shown a starter generator constructed in accordance with the invention. A rotary electric machine adapted to be operated as a brushless DC motor and as a magneto generator comprises a magneto rotor 1 and a stator 2. The magnet rotor 1 comprises a cup-like flywheel 101 provided on a crank shaft of an internal combustion engine, main poles P1 and P2 and interpoles Pa and Pb mounted on the flywheel 101 so that the main poles P1 and P2 and the interpoles Pa and Pb are alternately arranged on the flywheel 101 in a peripheral direction thereof.

The flywheel 101 may have a peripheral wall 101a, a bottom wall and a hub 101b provided on the bottom wall at its center. The hub 101b of the flywheel 101 may be mounted on the crank shaft of the engine.

The main poles P1 and P2 are formed of circular arc-shaped permanent magnets having a polar arc angle equal to each other. They may be attached by adhesive or the like to an inner face of the peripheral wall 101a of the flywheel while they are spaced with an angle of 180°. The permanent magnets which the main poles P1 and P2 are formed of are magnetized in a diametrical direction of the magneto rotor with a direction of magnetization different from each other so that N-pole and S-pole appear on the inner faces thereof, respectively.

The interpole Pa is disposed at a center of a space between a front end of the main pole P1 as viewed from the rotational direction of the main pole P1 as indicated by an arrow CL in FIG. 1 and a rear end of the main pole P2 as viewed from the rotational direction of the main pole P2 while the interpole Pb is disposed at a center of a space between a rear end of the main pole P1 viewed from the rotational direction thereof and a front end of the main pole P2 as viewed from the rotational direction of the main pole P2. Thus, it will be noted that the interpoles Pa and Pb are disposed with an angular space of 90° far from the main poles P1 and P2 relative to the faced direction thereof and with an angular space of 180° far from each other. The interpoles Pa and Pb are formed of magnetic material having a permeability higher than the permanent magnets of the main poles P1 and P2.

In the magnet rotor used for the starter generator of the invention, the interpoles are symmetrically disposed on both sides of the respective main poles so that each of the main poles and one of the adjacent interpoles constitute a rotor magnetic pole for the motor or a rotor magnetic pole for the generator.

Figure 7:
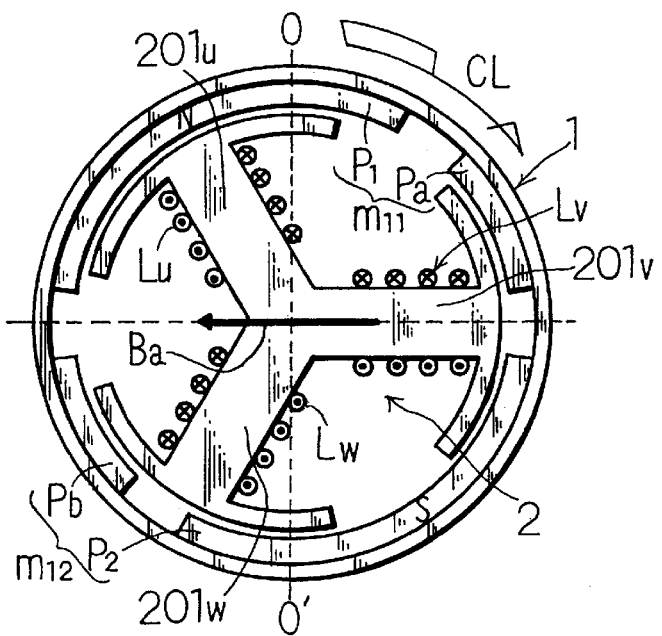
FIG. 7 illustrates how an armature reaction magnetomotive force is generated by the armature current when the starter generator of FIG. 1 is operated as a motor.

In the rotary electric machine shown in FIG. 1, when the engine starts, an armature current flows through armature coils Lu through Lw (Lu, Lv and Lw) as shown in FIG. 7 whereby the rotary electric machine is operated as the starter motor. As the magnet rotor 1 rotates in a clockwise direction as indicated by an arrow CL in FIG. 1, an armature reaction magnetomotive force is generated by the armature current flowing through the armature coils Lu through Lw.

In FIG. 7, a symbol "x" indicated inside of circular cross sections of electrically conductive materials which the armature coils Lu through Lw are formed of means that the armature current flows through them from a front face of a drawing sheet toward a back face thereof while a symbol "black dot" indicated inside of the circular cross sections of electrically conductive materials means that the armature current flows through them from the back face of the drawing sheet toward the front face thereof. Also, an arrow indicated by a mark "Ba" indicates a composite vector of the armature reaction magnetomotive force or the composite armature reaction magnetomotive force generated from the respective coils by the armature current flowing through the armature coils Lu through Lw.

Figure 8:
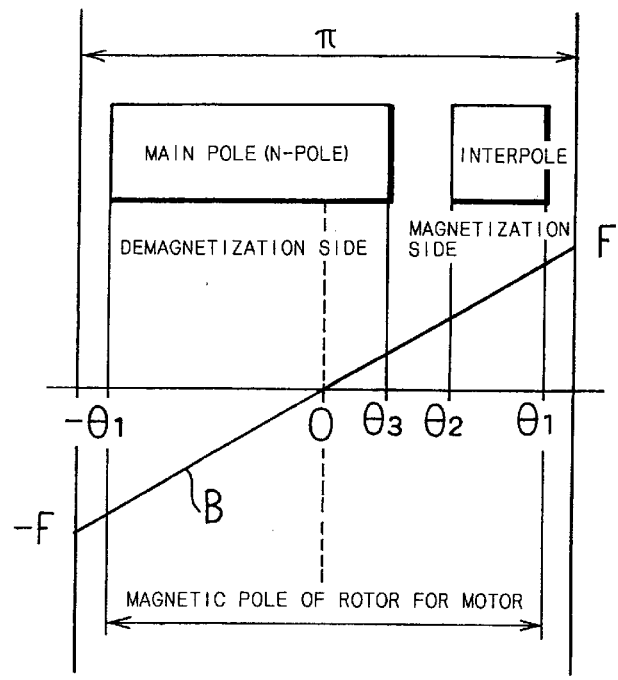
FIG. 8 illustrates a relationship between the armature reaction magnetomotive force and the magnetic filed of the magnet rotor when the starter generator of FIG. 1 is operated as a brushless DC motor.

More particularly, when the rotary electric machine of FIG. 1 is operated as the starter motor, the armature current flowing as shown in FIG. 7 generates the armature reaction magnetomotive force B as shown in FIG. 8, which causes the interpole positioned on an advanced or forward side as viewed in the rotational direction relative to each of the main poles to be magnetized with the same polarity as the main pole. The armature reaction magnetomotive force B has the maximum values F and –F at the center position of a middle axis between the rotor magnetic poles.

Actually, since a magnetic resistance of a magnetic path gets higher at a portion between the magnetic poles, the armature reaction magnetomotive force never increases in a linear manner toward the position of the middle axis between the magnetic poles, but drops at the position closer to the middle axis between the magnetic poles. However, it should be noted that this magnetic resistance is ignored in FIG. 8 and in the succeeding figures generally identical to it.

In this manner, when the rotary electric machine of FIG. 1 is operated as the starter motor, since the armature reaction magnetomotive force B as shown in FIG. 8 causes the interpole positioned on the advanced or forward side as viewed in the rotational direction relative to each of the main poles is magnetized with the same polarity as the main pole, each of the main poles and the adjacent interpole positioned on the advanced side relative to the corresponding main pole serve as the magnetic pole of the same polarity.

Figure 2:
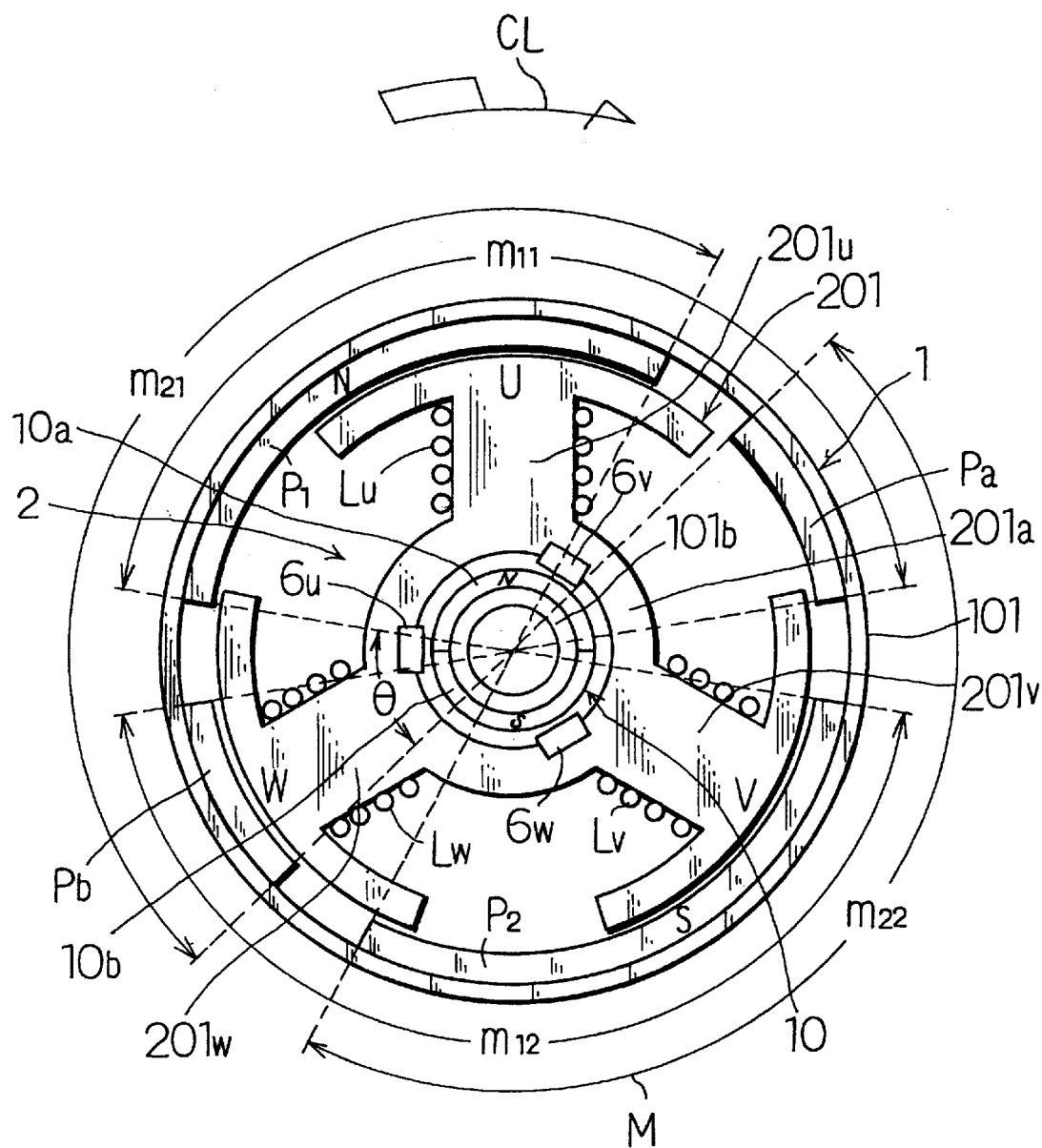
FIG. 2 is an enlarged front view of a gist portion of the starter generator of FIG. 1.

Thus, it will be noted from FIG. 2 that the main pole P1 and the interpole Pa positioned on the advanced or forward side relative to the main pole P1 serve as one magnetic pole m11 for the rotor of the motor while the main pole P2 and the interpole Pb positioned on the advanced or forward side relative to the main pole P2 serve as one magnetic pole m12 for the rotor of the motor.

Figure 10:
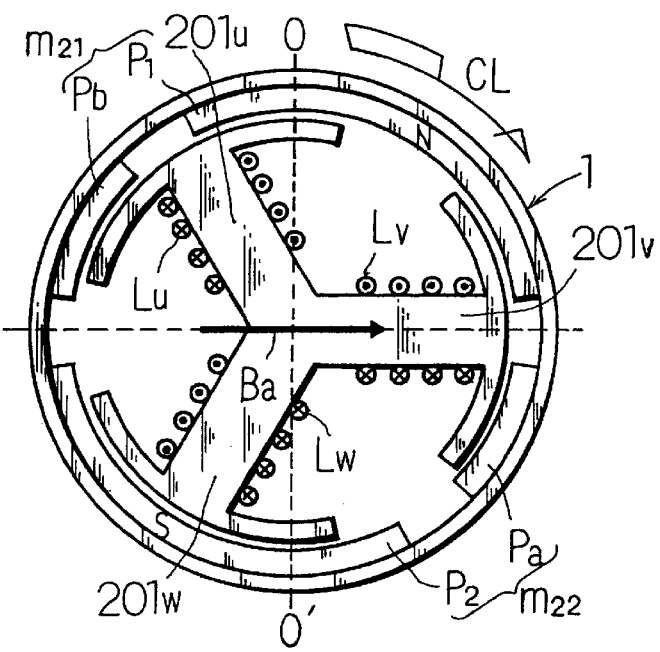
FIG. 10 illustrates how the armature reaction magnetomotive force is generated by the armature current when the starter generator of FIG. 1 is operated as a magneto generator.
Figure 11:
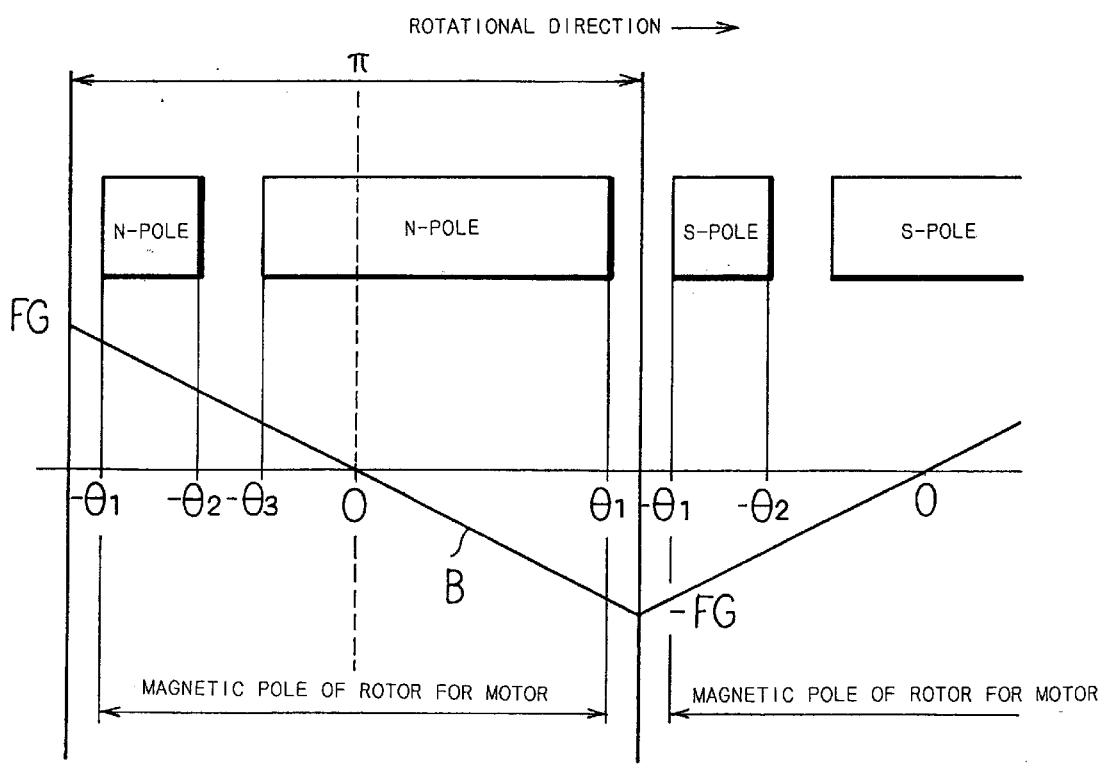
FIG. 11 illustrates a relationship between the armature reaction magnetomotive force and the magnetic filed of the magnet rotor when the starter generator of FIG. 1 is operated as the magneto generator.

When the illustrated rotary electric machine is operated as the magneto generator after the engine starts, since the armature current flows in a reverse direction to that when the it is operated as the motor as shown in FIG. 10, the armature reaction magnetomotive force B is generated as shown in FIG. 11. This magnetomotive force B causes the adjacent interpole positioned on the delayed side relative to the corresponding main pole to be magnetized with the same polarity as the main pole.

With the adjacent interpole Pb positioned on the delayed side relative to the corresponding main pole 1, the main pole P1 and the interpole Pb positioned on the delayed side relative to the main pole P1 serve as one magnetic pole m21 for the rotor of the generator while with the adjacent interpole Pa positioned on the delayed side relative to the corresponding main pole 2, the main pole P2 and the interpole Pa positioned on the delayed side relative to the main pole P2 serve as one magnetic pole m22 for the rotor of the generator.

The stator 2 which constitutes the rotary electric machine together with the magnet rotor 1 is disposed inside of the magnet rotor 1 and securely mounted on a stator mounting base provided in an engine case. In the illustrated embodiment, the stator 2 comprises an armature core 201 having three magnetic poles of teeth 201u through 201w (201u, 201v and 201w) radially protruded from an annular yoke 201a and three phase armature coils Lu through Lw wound on the respective teeth 201u through 201w of the three pole armature core 201.

In FIG. 1 is shown an inverter circuit 3 which comprises a switch circuit including six on-off controllable switch elements Qu though Qw (Qu, Qv and Qw) and Qx through Qz (Qx, Qy and Qz) connected to each other in the form of three phase bridge and a full-wave rectifier circuit including six diodes Du through Dw (Du, Dv and Dw) and Dx through Dz (Dx, Dy and Dz) connected to each other in the form of three phase bridge.

More particularly, the switch circuit comprises the upper side switch elements Qu through Qw at their one end connected commonly to each other and the lower side switch elements Qx through Qz at their one end connected to the other ends of the upper side switch elements Qu through Qw, respectively and at their other end connected commonly to each other.

Respective connection points of the other ends of the upper side switch elements Qu through Qw and the lower side switch elements Qx through Qw become AC terminals 3u through 3w (3u, 3v and 3w) for three U, V and W phases, to which are connected respectively non-neutral point terminals of the U, V and W phase armature coils Lu through Lw connected in a three phase star form.

A common connection point of the upper side switch elements Qu through Qw at their one end and a common connection point of the lower side switch elements Qx through Qw at their other end become a pair of positive and negative DC terminals 3p and 3n, between which are connected a battery 4 and a smoothing capacitor 5 in a parallel manner. To the battery 4 are connected an ignition system for the internal combustion engine and loads such as lamps and so on.

In the illustrated embodiment, the switch elements may comprise MOSFET. FETs which the bridge upper side switch elements Qu through Qw are formed of are commonly connected at their drain to each other and connected to a positive terminal of the battery 4. FETs which the bridge lower side switch elements Qx through Qz formed of are connected at their drain to sources of the FETs of the upper side switch elements Qu through Qw, respectively and connected commonly at their sources to each other and to a negative terminal of the battery 4. The smoothing capacitor 5 is connected between both ends of the battery 4.

On the outer peripheral face of the hub 101b of the flywheel 1 is provided a position detecting magnet 10 magnetized so as to have magnetic poles corresponding to the magnetic poles m11 and m12 of the rotor for the motor. In the illustrated embodiment, the position detecting magnet 10 may comprise two semi-circular permanent magnets 10a and 10b which are magnetized in a different direction so that N-pole and S-pole appear on the outer peripheral sides of the respective permanent magnets 10a and 10b and so that a center position of magnetization areas of the magnets 10a and 10b are coincident with a center position of the magnetic poles m11 and m12 of the rotor for the motor.

In order to determine an excitation pattern when the rotary electric machine of FIG. 1 is operated as the brushless DC motor, on the inner peripheral face of the yoke 201a of the armature core 201 with an angular space of 120° are provided position detectors 6u through 6w (6u, 6v and 6w) which serve to detect an angular position of the rotation of the magnet rotor relative to the U, V and W phase armature coils Lu through Lw, respectively. The position detectors 6u, 6v and 6w may comprise a Hole IC and detects the magnetic poles of the position detecting magnet 10 to generate voltage signals as position detection signals Hu through Hw (Hu, Hv and Hw) for the motor with levels different in accordance with the polarities of the magnetic poles being detected.

Although, in the illustrated embodiment, the three phase armature coils are provided in the rotary electric machine, the invention may be applied to the rotary electric machine having the N (N is an integral number of more than 2) phase armature coils provided therein. In this case, position detection means detects as the standard excitation switch position a position having a relationship of the center position of the magnetic pole portions at the leading ends of the teeth of the armature core on which the respective phase armature coils are wound and the center position of the respective magnetic poles of the magnet rotor previously set to generate signals including informations on the standard excitation switch position as respective phase position detection signals.

Switch control means provides a drive signal to the predetermined switch elements of the inverter circuit at the standard excitation switch position detected by the respective phase position detection signals or at the excitation switch position having the predetermined control phase angle relative to the standard excitation switch position so that from the battery via the predetermined switch elements of the inverter circuit through the armature coils flows a drive current of polarity necessary to rotate the rotor in the direction in which the internal combustion engine starts.

What the term "control phase angle" means is a phase difference between the standard excitation switch position detected by the position detection means and the actual excitation switch position (the rotary angle position of the rotor when the phase of the armature coils through which the drive current flows is switched). In this description, this control phase angle is supposed to have a positive or negative value. The control phase angle is made positive when the actual excitation phase switch position is on the advanced side relative to the standard excitation switch position while the control phase angle is made negative when the actual excitation phase switch position is on the delayed side relative to the standard excitation phase switch position.

In the brushless DC motor of more than three phase, the combination of the excitation phase is sequentially switched in accordance with the position of the rotor while the armature coils of more than two phases are excited at once. Thus, it will be noted that with the rotary electric machine having the multi-phase armature coils of more than three phases, the excitation phase switch position when it is operated as the starter motor when the engine starts is one which switches the combination of the excitation phases of the armature coils.

The aforementioned standard excitation phase switch position is not reasonably determined on the mechanical construction of the rotary electric machine, but on the position where the position detectors are mounted. In the conventional brushless DC motor, the position where the position detectors are mounted may be properly set in accordance with the conducting angle (electric angle) over which the drive current flows through the respective armature coils.

For example, in case that the motor rotates while there occurs a 180° switching control in which the current flows through the armature coils over 90° before and behind the position where the no-load induction voltage induced in the armature coil when the drive current flows through the respective phase armature coils reaches a peak value that is a magnetic flux flowing through the teeth of the armature core on which the respective phase armature coils are wound passes a zero point, the position detectors for detecting the respective phase position detection signals are provided so as to detect the rotary angle position of the rotor when the center position (in the peripheral direction) of the magnetic poles at the leading ends of the teeth of the armature core on which the respective phase armature coils are wound is coincident with the center position of the respective magnetic poles of the magnet filed of the rotor.

In case that the motor rotates while there occurs a 120° switching control in which the current flows through the armature coils over 60° before and behind the position where the no-load induction voltage induced in the armature coil when the drive current flows through the respective phase armature coils reaches a peak value, the position detectors for U, V and W phases are conventionally provided in the position advanced by 60° from the center position of the magnetic pole portions of the teeth 201u through 201w, respectively to detect the magnetic poles of the magnet field so that there are obtained U, V and W phase position detection signals of rectangular waveform varying in their level whenever the center position of the respective magnetic poles of the magnet field is coincident with the position delayed by an electric angle of 30° from the center position of the magnetic pole portions at the leading ends of the teeth 201u through 201w.

Thus, when the center position of the respective magnetic poles of the magnet field is in a state of being coincident with the position delayed by an electric angle of 30° from the center position of the magnetic pole portions at the leading ends of the teeth 201u through 201w, they get the standard excitation phase switch positions for the respective phases, which correspond to the positions where the position detection signals obtained from the respective phase detectors vary in their level.

In case that the brushless DC motor rotates while the 180° or 120° switching control are made, with the position detectors disposed as aforementioned so as to obtain the respective phase position detection signals, the maximum starting torque can be obtained by controlling the switch elements of the inverter so as to switch in a predetermined manner the combination of the phase armature coils excited when the control advance angle is zero or at the standard excitation phase switch position where the respective phase position detection signals vary in their level (at the position where the position detection signals rises and falls).

It should be understood that the position detectors are not always required to be mounted as aforementioned, but they may be mounted so as to generate the detection signals at the standard excitation phase switch position which may be conveniently set for controlling the inverter circuit.

In the embodiment illustrated in FIG. 1, as the generator is operated as the brushless DC motor while the drive current flows from the battery via the switch elements of the inverter circuit 3 through the three phase armature coils when the internal combustion engine starts, the 180° switching control is supposed to be made which the drive current flows through the respective phase armature coils over the electrical angle of 180°.

Thus, in the illustrated embodiment, following how the position detectors are conventionally disposed in case of 180° switching control, the respective phase position detectors are disposed at the phase position advanced by the electrical angle of 90° relative to the center position of the magnetic pole at the leading end of one of the teeth where the corresponding armature coils are wound so as to detect the polarity of the magnetic poles of the position detecting magnets 10 whereby the position where the center position of the respective magnet poles of the magnet field is coincident with the center position of the magnetic pole portions of the teeth on which the respective phase armature coils are wound is detected as the standard excitation phase switch position.

The position detection signals Hu through Hw (Hu, Hv and Hw) generated by the position detectors 6u through 6w may be ones of any waveform including informations on the standard excitation phase switch position when the rotary electric machine is operated as the brushless DC motor, but in case that there are used Holes IC as the position detectors, since the Holes IC generate signals having a level different on whether the polarities of the detected magnetic poles are N-pole or S-pole, the position detection signals should have a rectangular waveform and the position where the position detection signals rises and falls become the respective standard excitation phase switch position.

FIGS. 1 and 2 illustrate the instance when the output signal of the position detector 6u varies by detecting the terminal end (the rear end as viewed in the rotational direction) of the N-pole of the position detecting magnet 10. As the level of the signal varies, it is detected that the center position of the magnetic pole m11 of the magnetic field corresponds to the center position of the magnetic pole portion 201u of the tooth 201u on which the U phase armature coil Lu is wound or that the rotary angle position of the rotor corresponds to the U phase standard excitation phase switch position when the rotary electric machine is operated as the motor.

Switch control means 7 is formed of a microcomputer or a logic circuit. The switch control means has input terminals to which are input the position detection signals Hu through Hw generated by the position detectors 6u through 6w, respectively and output terminals from which are output the drive signals Su through Sw (Su, Sv and Sw) and Sx through Sz (Sx, Sy, Sz) which are in turn supplied to the respective control terminals of the switch elements Qu through Qw and Qx through Qz (in the illustrated embodiment, the gates of the MOSFETs). The switch control means 7 serves to provide the drive signals to the predetermined MOSFETs (switch elements) of the switch circuit of the inverter circuit 3 at the excitation phase switch position determined on the standard excitation phase switch position detected by the position detectors 6u through 6w relative to the three phase armature coils Lu through Lw so that the drive current of polarity necessary for rotating the magnet rotor 1 in the direction in which the engine starts flows from the battery 4 via the inverter circuit 3 through the armature coils Lu through Lw.

Also, in the illustrated embodiment, there are provided timers 11u through 11u (11u, 11v and 11w) for generator position detection signals hu through hw (hu, hv and hw) for U, V and W phases to start counting when motor position detection signals Hu through Hw (Hu, Hv and Hw) are generated by the position detectors 6u through 6w, respectively. The timers 11u through 11w serve to generate the generator position detection signals hu through hw for the U, V and W phases when they count the time corresponding to the phase difference θ between the magnetic poles m11 and m12 of the motor rotor and the magnetic poles m21 and m22 of the generator rotor as shown in FIG. 2, which it should be noted varies on the revolution of the rotor.

The position detection signals of the respective phases are ones including informations on the standard excitation phase switch positions for the respective phases which correspond to the condition where the center position of the magnetic poles of the generator rotor comprising the respective main poles of the magnet rotor 1 and the adjacent interpoles disposed on the rear side as viewed from the rotational direction of the magnet rotor corresponds to the center position of the magnetic pole portions at the leading ends of the teeth of the armature core on which the armature coils are wound.

In the embodiment, means to generate the position detection signals of the respective phases for the generator is formed by delaying the phases of the motor position detection signals generated by the three phase position detectors 6u through 6w, which may be caused by the timers 11u through 11w for generating the position detection signals of the U, V and W phases. The position detection means is formed of the means to generate the position detection signals for the generator and the position detectors 6u through 6w.

Figure 5:
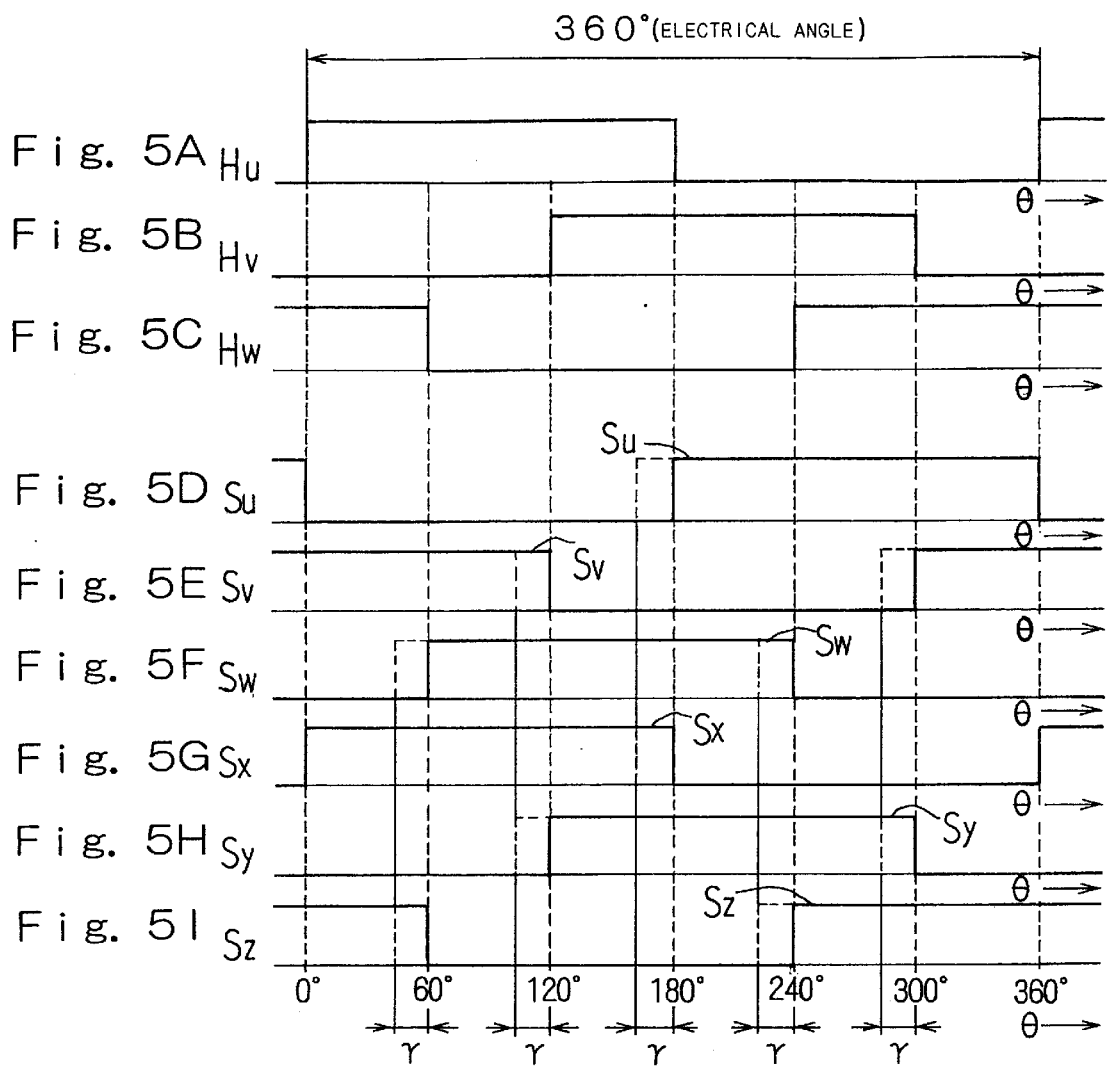
FIG. 5 illustrates waveforms of signals at various portions of the starter generator of FIG. 1.

As shown in FIGS. 1 and 2, with the three phase position detectors 6u through 6w disposed at the position advanced by the electrical angle of 90° relative to the center position of the magnetic pole portions of the teeth 201u through 201w on which the armature coils of the U, V and W phases are wound, supposed that a high level signal is output when the position detectors detect the N-pole, the motor position detection signals Hu through Hw detected by the position detectors 6u through 6w are in the form of rectangular waveform signals which are sequentially generated with the phase difference of 120° electrical angle as shown in FIGS. 5A through 5C. The position where the motor detection signals Hu through Hw rise and the position where they fall are the standard excitation phase switch positions for the U, V and W phases when the rotary electric machine is operated as the starter motor or the brushless DC motor.

In the embodiment, the on-off control of the switch elements is made so that they are in the off condition over the electrical angle of 180° while they are in the off condition over the remaining electrical angle of 180°, which is called 180° switching control. The standard switching patterns of the switch elements Qu through Qw and Qx through Qz is determined as shown in FIGS. 5(D) through 5(I).

FIGS. 5(D) through 5(I) show the wavforms of the drive signals Su through Sw (Su, Sv, Sw) and Sx through Sz (Sx, Sy, Sz) applied to the switch elements Qu through Qw and Qx through Qz. The drive signals have a high level as shown in FIGS. 5(D) through 5(I), respectively. While the drive signals Su through Sw and Sx through Sz are generated, the switch elements Qu through Qw and Qx through Qz are driven, respectively and while the drive signals Su through Sw and Sx through Sz are not generated, the switch elements Qu, Qv, Qw and Qx, Qy, Qz are not driven, respectively.

In the standard switching pattern of the 180° switching control shown in FIGS. 5(D) through 5(I), the period during which the motor position detection signals Hu through Hw obtained by the position detectors 6u through 6w detecting the rotary angle position of the magnet rotor relative to the armature coils Lu through Lw of the U, V and W phases have the high level, which corresponds to the period during which the position detectors are detecting one of the magnetic poles of the magnet field is made a non-driving period of the switch elements Qu through Qw corresponding to the upper side of the bridge while the period during which the motor position detection signals Hu through Hw have the low level, respectively is made the driving period of the switch elements Qx through Qz corresponding to the lower side of the bridge.

As the switch elements Qu through Qw and Qx through Qz are on-off controlled in accordance with the standard switch pattern as shown in FIGS. 5(D) through 5(I), from the battery 4 through the switch circuit of the switch elements Qu through Qw and Qx through Qz to the armature coils Lu through Lw is applied an AC voltage having the same phase as a voltage induced in the armature coils Lu through Lw by the rotation of the magnet rotor, which corresponds to the voltage induced as the generator.

In the starter generator shown in FIG. 1, when the engine starts, the switch control means 7 gives the drive signals Su through Sw and Sx through Sz to the switch elements Qu through Qw and Qx through Qz of the inverter circuit 3, respectively at the predetermined standard excitation phase switch position or at the predetermined excitation phase switch position having the control phase angle relative to the standard excitation phase position so that the drive current flows while it is sequentially transferred to the armature coils Lu through Lw in a predetermined phase sequence. This causes the magneto generator to be operated as the brushless Dc motor to rotate the magnet rotor 1 and the output of the engine in the direction in which the engine starts.

After the engine starts, the rotary electric machine is operated as the magneto generator and the battery 4 is charged by the output from the magneto generator. When the rotary electric machine is operated as the magneto generator, the drive signals are applied to the predetermined switch elements of the inverter circuit 3, respectively at the predetermined standard excitation phase switch position for the generator or at the predetermined excitation phase switch position for the generator having the control phase angle relative to the standard excitation phase position so that a characteristic of the output voltage of the armature coils to the output current is made as predetermined. This causes the control current to flow from the battery 4 through the armature coils Lu through Lw. The controlling magnetomotive force generated by the control current increases or decreases the quantity of magnetic flux interlinked with the armature coils Lu through Lw to adjust the output of the generator.

In order to more easily understand the principle of the invention, the armature reaction of the rotary electric machine with the magnet field will be explained hereinjustbelow.

Figure 15:
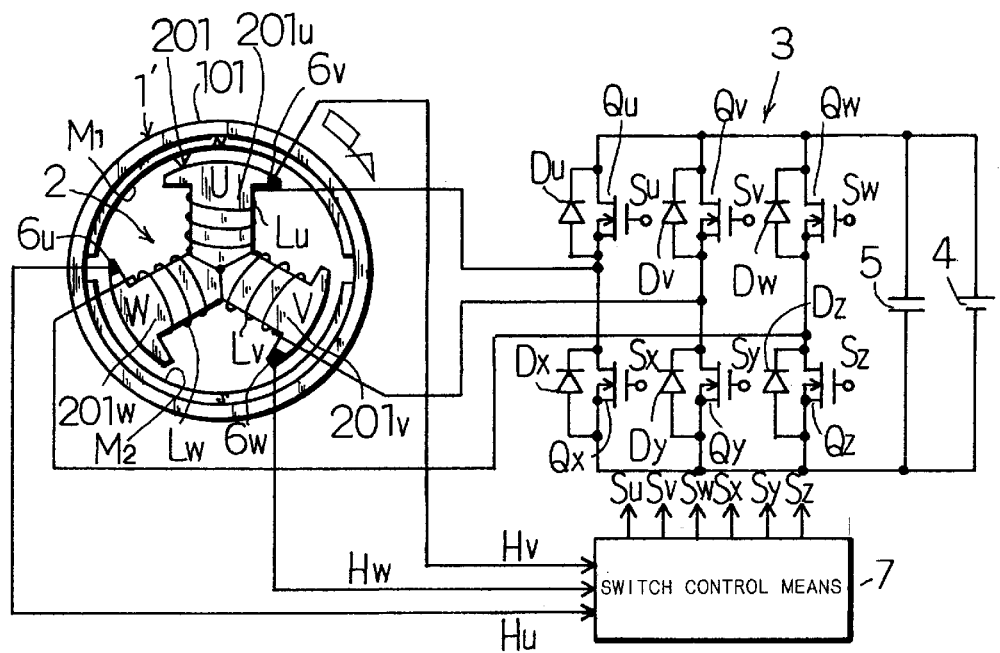
FIG. 15 is a schematic diagram of a prior starter generator without any interpoles.

The rotary electric machine having the magnet field formed of only permanent magnet without any interpoles is shown in FIG. 15. The flywheel magnet rotor 1' comprises a flywheel 101 provided on a crank shaft of an internal combustion engine and circular arc-shaped permanent magnets M1 and M2 mounted on an inner peripheral face of the flywheel 101 while the stator 2 comprises a three pole armature core 201 and three phase armature coils Lu through Lw which are wound on teeth 201u through 201w of the three pole armature core 201, respectively.

The permanent magnets M1 and M2 are magnetized in a radial direction of the rotor with the magnetization direction different from each other so that N-pole and S-pole alternately appear on their inner face.

The armature coils Lu through Lw are connected to each other in a three phase star form and connected to AC terminals of an inverter circuit 3 which comprises six on-off controllable switch elements Qu through Qw and Qx through Qz which are connected to each other in a three phase bridge form and diodes Du through Dw and Dx through Dz which are connected to the switch elements in a parallel manner. A battery 4 and a smoothing capacitor 5 are connected across DC terminals of the inverter circuit 3.

In order to determine an excitation pattern when the rotary electric machine of FIG. 15 is operated as the brushless DC motor, position detectors 6u through 6w are provided on the stator 2 and serve to detect a rotary angle position of the magnet rotor relative to the U, V and W phase armature coils.

The position detectors 6u through 6w may comprise a magnetic sensor such as a Hole IC. The position detector 6u provided corresponding to the U phase armature coil detects the magnetic pole of the magnet rotor 1' at the phase position advanced by an electrical angle of 90° relative to the U phase armature coil Lu and thereby generates a U phase position detection signal Hu. Similarly, the position detectors 6v and 6w provided corresponding to the V and W phase armature coils Lv and Lw detect the magnetic poles of the magnet rotor 1' at the phase position advanced by an electrical angle of 90° relative to the V and W phase armature coils Lv and Lw and thereby generate V and W phase position detection signals Hv and Hw, respectively. The thus obtained position detection signals Hu through Hw are input to switch control means 7.

Figure 16:
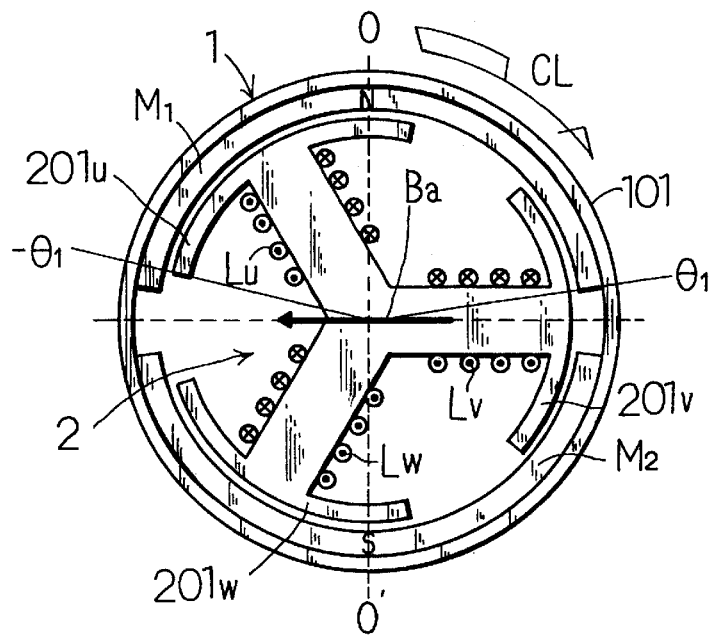
FIG. 16 illustrates how the armature reaction magnetomotive force is generated by the armature current when the starter generator of FIG. 15 is operated as a motor.

When the rotary electric machine of FIG. 15 is used for a starter generator, the switch control means 7 provides the drive signals Su through Sw and Sx through Sz at the predetermined timing to the switch elements Qu through Qw and Qx through Qz of the inverter circuit 3, respectively so that the drive current flows while it is sequentially transferred to the armature coils Lu through Lw in a predetermined phase sequence in accordance with the rotary angle position of the magnet rotor 1' when the engine starts, which causes the rotary electric machine to be operated as the brushless DC motor to rotate the magnet rotor 1' in a direction indicated by an arrow CL in FIG. 16, which is a clockwise direction. Thus, the armature reaction magnetomotive force is generated by the armature current flowing through the armature coils Lu through Lw and acts on the permanent magnets M1 and M2.

In FIG. 16, a symbol "x" shown inside of circular cross sections of electrically conductive materials which the armature coils Lu through Lw are formed of indicates that the armature current flows through them from a front face of a drawing sheet toward a back face thereof while a symbol "black dot" shown inside of the circular cross sections of electrically conductive materials indicates that the armature current flows through them from the back face of the drawing sheet toward the front face thereof. Also, a mark "Ba" indicates a composite vector of the armature reaction magnetomotive force or the composite armature reaction magnetomotive force generated from the respective coils by the armature current flowing through the armature coils Lu through Lw.

Figure 17:
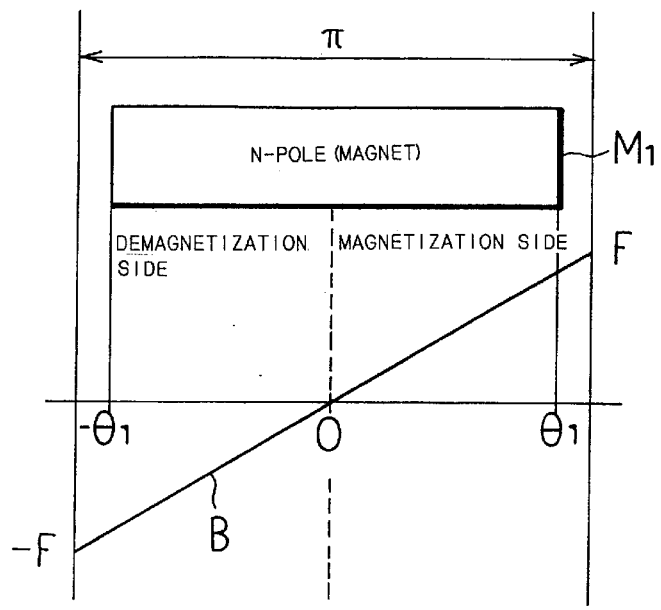
FIG. 17 illustrates a relationship between the armature reaction magnetomotive force and the magnetic filed of the magnet rotor when the starter generator of FIG. 15 is operated as the motor.

With the peripheral area of the magnet rotor divided into an N-pole area and an S-pole area which have a mechanical angle of 180° ($\pi$), respectively, the armature reaction magnetomotive force B when the armature current flows as shown in FIG. 16 will be as shown in FIG. 17. This armature reaction magnetomotive force has a maximum value of F and −F at the position of the middle axis between the magnetic poles of the rotor.

As the rotary electric machine is operated as the magneto generator after the engine starts, a three-phase AC voltage induced in the armature coils Lu through Lw is rectified by through a full-wave rectifier circuit of diodes Du through Dw and Dx through Dz and then applied to the battery 4.

Figure 19:
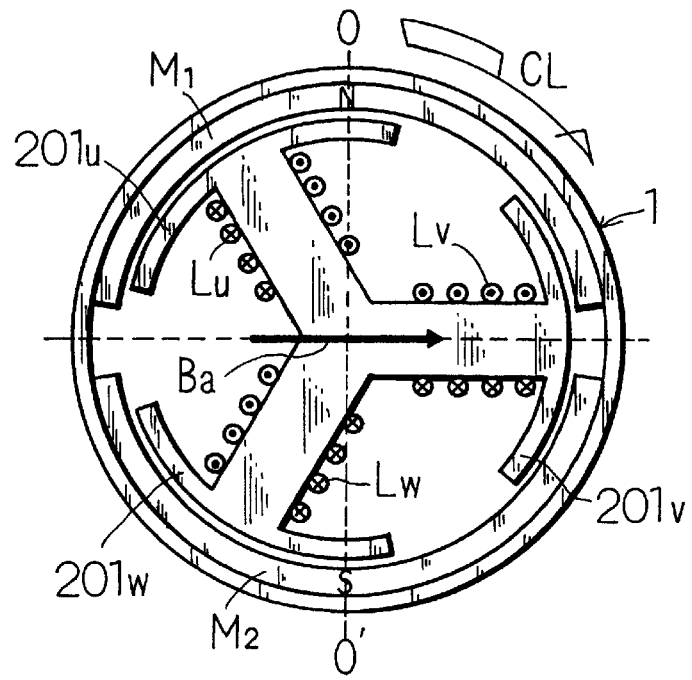
FIG. 19 illustrates how the armature reaction magnetomotive force is generated by the armature current when the starter generator of FIG. 15 is operated as a generator.
Figure 20:
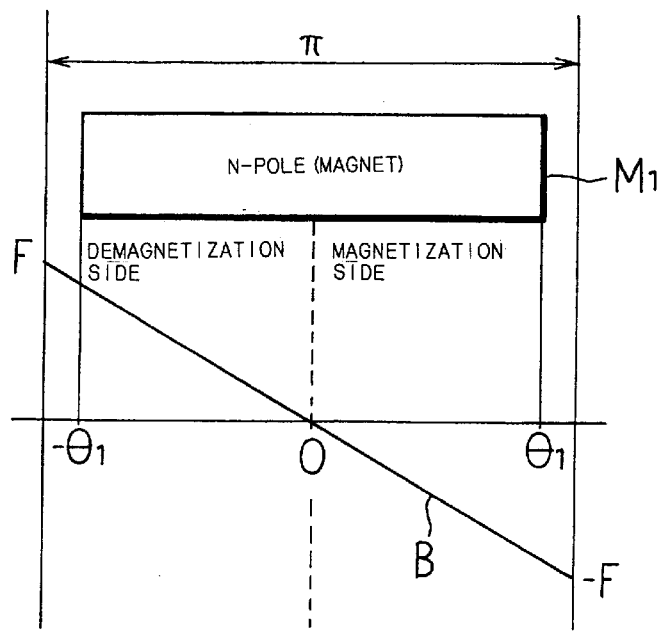
FIG. 20 illustrates a relationship between the armature reaction magnetomotive force and the magnetic filed of the magnet rotor when the starter generator of FIG. 15 is operated as the generator.

As the rotary electric machine is operated as the magneto generator after the engine starts, the armature current flows through the armature coils Lu through Lw ash shown in FIG. 19 and the armature reaction magnetomotive force is generated by the armature current flowing through the respective phase armature coils Lu through Lw and acts on the permanent magnets M1 and M2. In FIG. 19, a mark "Ba" indicates a composite vector of the armature reaction magnetomotive force generated from the respective coils by the armature current flowing through the armature coils Lu through Lw when the rotary electric machine is operated as the generator. The a magnitude of magnetic flux flowing through the portions of the N-pole area when the composite armature reaction magnetomotive force is generated as shown in FIG. 19 is generally shown in FIG. 20.

The starter generator of FIG. 15 is required to have a function of the engine starting motor. To this end, the starter generator is required to determine a winding specification having a priority of generating a high torque by the sufficiently larger armature current flowing through the armature coils when the engine starts. Thus, the armature coils should be of lower resistance and inductance. The thus formed rotary electric machine, when it is operated as the motor, generates the high torque to function as the engine starting motor, but hardly generate enough generator output when it is operated as the magneto generator after the engine starts. Thus, it cannot disadvantageously obtain the output enough to charge the battery unless the revolution of the engine gets higher.

Figure 14:
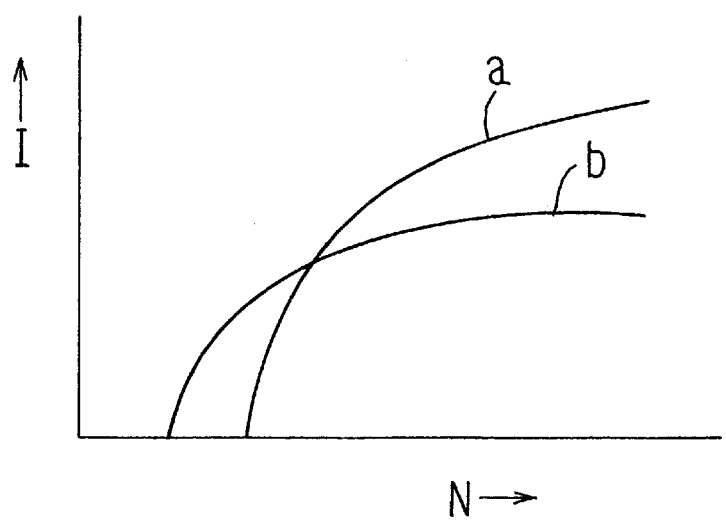
FIG. 14 is a diagram which illustrates a characteristic of output to revolution obtained when the starter motor for the internal combustion engine is operated as the generator and a characteristic of output to revolution required when it is operated as the battery charging generator.

More particularly, in case that the rotary electric machine having the winding specification suitable for the engine starting motor is operated as the magneto generator, a characteristic of revolution (N) to output current (I) is as indicated by a curve (a) of FIG. 14. Thus, it will be noted that it cannot only generate the output enough for charging the battery in the low revolution range of the engine, but also generates an excessive output to overcharge the battery in the high revolution range of the engine.

The characteristic of the generator required to properly charge the battery is one of raising the output of the generator in the low revolution range of the engine and saturating and limiting the output thereof when the engine rotates at high revolution as indicated by a curve (b) of FIG. 14. Since it is required to have more winding number of the armature coils in order to obtain the characteristic of the curve (b) of FIG. 14 so as to heighten its inductance, which is incompatible with the winding specification required for the starter motor.

As aforementioned, in case that the rotary electric machine of FIG. 15 which might be used as the starter generator is operated as the brushless Dc motor by the armature current flowing through the armature coils while the excitation phase is switched at the standard excitation phase switch position, the armature current generates the armature reaction magnetomotive force B as shown in FIG. 17.

The magnetomotive force B has the maximum values of F and −F at the middle axis between the magnetic poles of the rotor. This armature reaction magnetomotive force B provides further magnetization action at a half of the rotor magnetic field on the advanced side thereof in the rotational direction while it provides demagnetization action at a half of the rotor magnetic filed on the delayed side thereof.

Supposed that the center of the rotor magnetic poles in their peripheral direction is taken as zero point O and that the end positions of the rotor magnetic poles on the advanced and delayed sides thereof in the rotational direction are −θ and θ, respectively, the armature reaction average magnetomotive force B1 on the side of the further magnetization action is given by the following expression (1);

$$B1=\{\theta1/(\pi/2)\}F\times(\tfrac{1}{2})=\theta1F/\pi \tag{1}$$

and the armature reaction average magnetomotive force B2 on the side of the demagnetization action is given by the following expression (2);

$$B1=\{-\theta1/(\pi/2)\}F\times(\tfrac{1}{2})=-\theta1F/\pi \tag{2}$$

In these expressions, supposed that all magnetic flux generated from the magnets of the rotor magnetic poles is indicated by $\phi$ and that a permeance of the magnets is indicated by Pm, the magnetic flux $\phi1$ flowing through the half of the rotor magnetic pole subject to the further magnetization action and the magnetic flux $\phi2$ flowing through the half of the rotor magnetic pole subject to the demagnetization action are given by the following expressions (3) and (4), respectively;

$$\phi1=(\phi/2)+(Pm/2)(\theta1F/\pi) \tag{3}$$

$$\phi2=(\phi/2)-(Pm/2)(\theta1F/\pi) \tag{4}$$

It will be noted from the expressions (3) and (4) that all the magnetic flux $\phi$ flowing through the rotor magnetic poles is given by the expression $\phi 0=\phi 1+\phi 2=\phi$ and the quantity of magnetic flux flowing through the whole rotor magnetic poles will never vary. Thus, it will be noted that the rotary electric machine comprising the entire rotor magnetic poles formed of only permanent magnets have no variation in the total quantity of the magnetic flux flowing through the rotor magnetic poles even though the armature current flows through the armature coils because the components of magnetization and demagnetization due to the armature reaction magnetomotive force are balanced.

Figure 12:
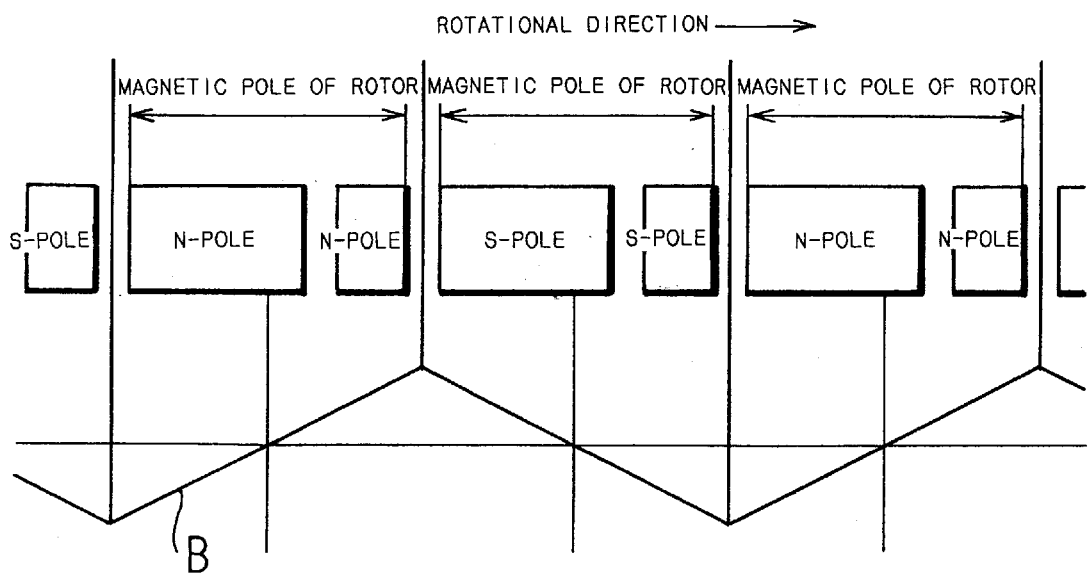
FIG. 12 illustrates a relationship between the armature reaction magnetomotive force and the magnetic filed of the magnet rotor when the starter generator of FIG. 1 is operated as a motor.

On the other hand, in case that the rotary electric machine with the interpoles as shown in FIG. 1 is operated as the brushless DC motor, the armature reaction magnetomotive force B shown in FIGS. 8 and 12 is produced so that the interpole positioned on the advanced side of the rotor relative to the corresponding main pole is magnetized with the same polarity as the main pole.

With the portion of the rotor magnetic poles formed of the interpole in this manner, supposed that the angle from the center of the rotor magnetic pole in the peripheral direction to the end of the main pole on the side of the interpole is given by θ3 and that the angle from the center of the rotor magnetic pole to the end of the interpole on the side of the main pole is given by θ2, then the armature reaction average magnetomotive force acting on the portion of the magnet on the side of the magnetization will be given by the following expression (5);

$$\{\theta 3/(\pi/2)\}F\times(\frac{1}{2})=\theta 3F\pi \qquad (5)$$

The permeance of the portion of the magnet subject to the magnetization action will be given by the following expression (6);

$$(Pm/2)\times(\theta 3/\theta 1) \qquad (6)$$

The magnetic flux flowing through the portion of the magnet on the side of the magnetization is given by the following expression (7);

$$(Pm/2)(\theta 3/\theta 1)\times(\theta 3/\pi)F \qquad (7)$$

Thus, the armature reaction average magnetomotive force acting on the interpole is given by the following expression (8);

$$[\{(\theta 1+\theta 2)/2\}/(\pi/2)]F(\frac{1}{2})=(\theta 1+\theta 2)F/2\pi \qquad (8)$$

Supposed that the permeance of the interpoles is expressed by PH, the magnetic flux flowing through the interpole due to the armature reaction magnetomotive force is given by the following expression (9);

$$PH\{\theta 1+\theta 2)/2\pi\}F \qquad (9)$$

Supposed that the magnetic flux generated from the magnet which the entire rotor magnetic poles are formed of is expressed by $\phi$, the magnetic flux flowing through the portion of the magnet subject to the magnetization action is given by the following expression (10);

$$(\phi/2)\times(\theta 3/\theta 1) \qquad (10)$$

With the expressions (7), (8) and (9) added, the magnetic flux $\phi 1$ flowing through the half of the rotor magnetic poles subject to the magnetization action is given by the following expression (11);

$$\phi 1=(\phi/2)\times(\theta 3/\theta 1)+(Pm/2)(\theta 3/\theta 1)\times(\theta 3/\pi)F+(\theta 1+\theta 2)/F/2\pi \qquad (11)$$

The magnetic flux $\phi 2$ flowing through the portion subject to the demagnetization action due to the armature reaction magnetomotive force of the rotor magnetic poles is given by the following expression (12);

$$\phi 2=(\phi/2)-(Pm/2)(\theta 1/\pi)F \qquad (12)$$

The total flux $\phi 0$ flowing through the rotor magnetic pole is given from the expressions (11) and (12) by the following expression (13);

$$\phi 0 = \phi 1 + \phi 2 \qquad (13)$$
$$= \phi(\theta 1 + \theta 3)/(2\theta 1) - Pm(\theta 1 + \theta 3)/(2\theta 1)(F/\pi)(\theta 1 - \theta 3) +$$
$$PH(F/\pi)\{(\theta 1 + \theta 2)/2\}$$

Figure 6:
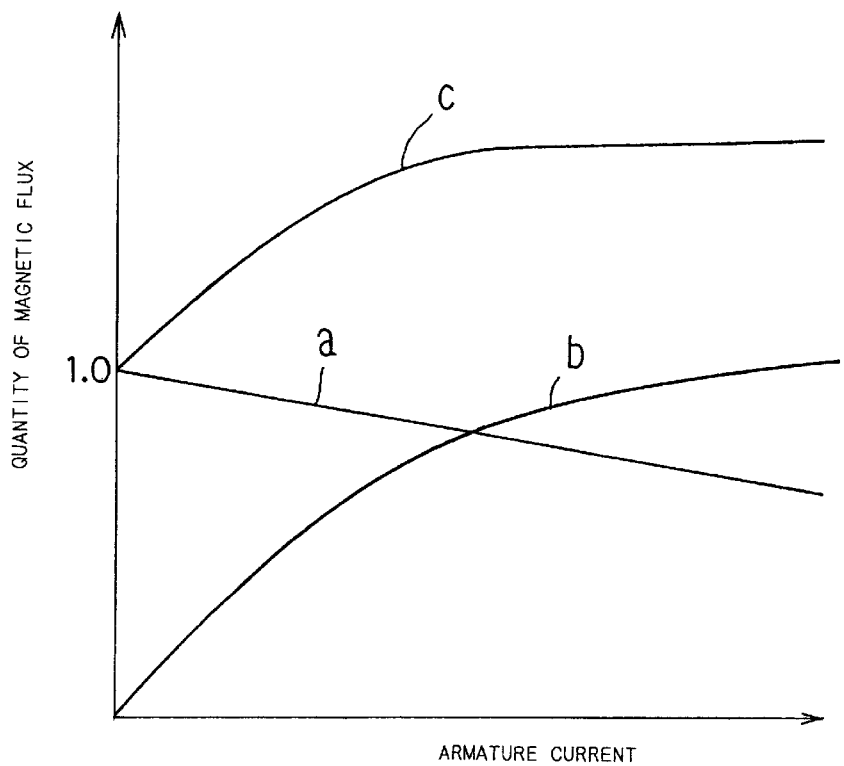
FIG. 6 is a diagram which illustrates a relationship between a quantity of magnetic flux flowing through magnetic poles of a rotor and a current flowing through armature coils in the starter generator of FIG. 1.

The magnetic flux of the first and second paragraphs of the expression (13) decrease as the armature current increases as indicated by a linear line (a) of FIG. 6, but the magnetic flux of the third paragraph of the expression (13) increases as the armature current increases as indicated by a curve (b) of FIG. 6. The magnetic flux flowing through the entire the magnetic poles of the rotor varies as indicated by a curve (c) of FIG. 6.

With the portion of the rotor magnetic poles formed of the interpoles, the quantity of magnetic flux flowing through the entire magnetic poles of the rotor gets lower because of the small volume of the magnet, which corresponds to $(\theta 1+\theta 3)/(2\theta 1)$ times as much as the quantity of magnetic flux in case of the entire magnetic poles of the rotor being formed of only magnets, but as the total quantity of magnetic flux of the second and third paragraphs of the expression (13) gets more than $\phi\times(\theta 1+\theta 3)/(2\theta 1)$, there flows more magnetic flux than the quantity of magnetic flux $\phi$ generated from the magnets which the entire magnetic poles of the rotor are formed of. This is caused by facilitating the magnetic flux to flow through the interpoles due to the armature reaction magnetomotive force. The quantity of magnetic flux indicated on an axis of abscissa of FIG. 6 is shown as a ratio relative to the quantity of magnetic flux in case of the armature current being zero.

Figure 18:
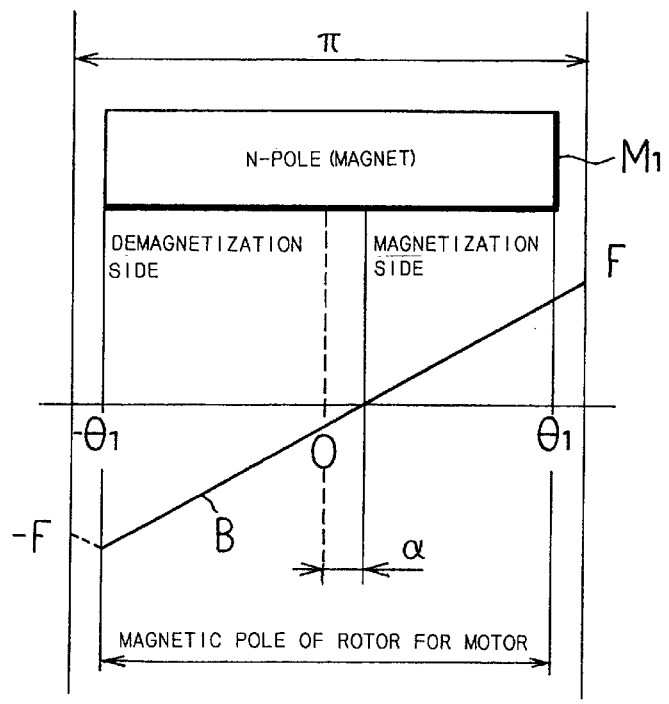
FIG. 18 illustrates a relationship between the armature reaction magnetomotive force and the magnetic filed of the magnet rotor when the starter generator of FIG. 15 is operated as the motor while the excitation phase is switched having the predetermined control excitation phase.

With the rotary electric machine without any interpole as shown in FIG. 15 operated as the brushless DC motor, it is supposed that the excitation phase switch position is advanced by the control phase angle α from the standard excitation phase switch position as shown in FIG. 18. The quantity of magnetic flux $\phi 1$ flowing through the portion of the rotor magnetic poles on the side of the magnetization action is indicated by the following expression (14);

$$\phi 1=\phi\times(\theta 1-\alpha)/(2\theta 1)+\{Pm(\theta 1-\alpha)/(2\theta 1)\}\times(\theta 1-\alpha)/\pi)F \qquad (14)$$

The quantity of magnetic flux $\phi 2$ flowing through the portion of the rotor magnetic poles on the side of the demagnetization action is given by the following expression (15);

$$\phi 2==(\theta 1+\alpha)/(2\theta 1)-\{Pm\,(\theta 1+)/(2\theta 1)\}\times\{(\theta 1+\alpha)\}F \qquad (15)$$

Thus, the total quantity of magnetic flux is given by the following expression (16);

$$\phi A=\phi 1+\phi 2=\phi-PmF(2\alpha/\pi) \qquad (16)$$

In case that the control phase angle α is positive or in case that the when the excitation phase switch position is advanced from the standard excitation phase switch position, the second paragraph of the expression (16) functions as the quantity of demagnetization. In case that the control phase angle α is negative or in case that the when the excitation phase switch position is delayed from the standard excitation phase switch position, the second paragraph of the expression (16) functions as the quantity of magnetization. Thus, it will be noted that the brushless DC motor lowers the output torque thereof as the control phase angle is advanced while it heightens the output torque thereof as the control phase angle is delayed.

Figure 9:
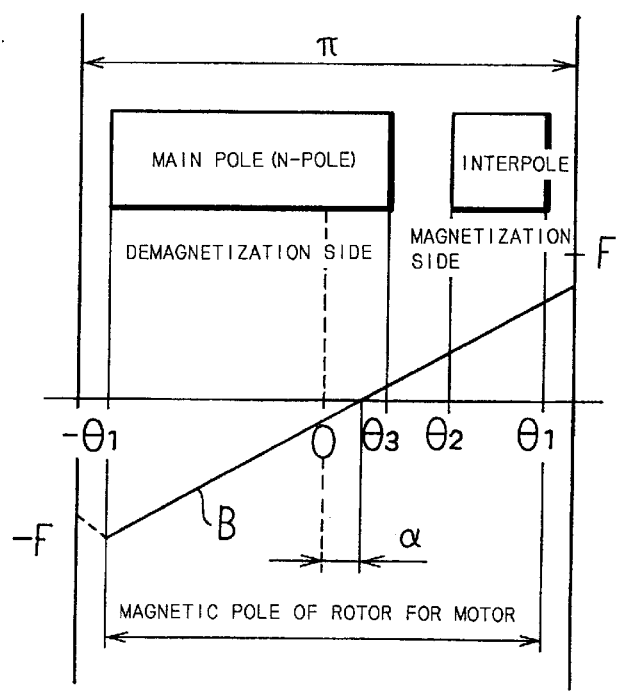
FIG. 9 illustrates a relationship between the armature reaction magnetomotive force and the magnetic filed of the magnet rotor when the starter generator of FIG. 1 is operated as a brushless DC motor while the excitation phase is switched having the predetermined control excitation phase.

With the rotary electric machine having the interpoles by which the portion of the rotor magnetic poles is displaced as in the present invention, it is supposed that the excitation phase switch position is advanced by the control phase angle α from the standard excitation phase switch position as shown in FIG. 9. The quantity of magnetic flux flowing through the portion of the magnet subject to the magnetization action is indicated by the following expression (17);

$$\{Pm(\theta 3-\alpha)/(2\theta 1)\}\{F/(\pi/2)\}\{(\theta 3-\alpha)/2\} = Pm\{(\theta 3-\alpha)/(2\theta 1)\}\{(\theta 3-\alpha)/\pi\}F \quad (17)$$

The quantity of magnetic flux φ2 flowing through the portion of the magnet subject to the demagnetization is given by the following expression (18);

$$\{Pm(\theta 1+\alpha)/(2\theta 1)\}\{F/(\pi/2)\}\{(\theta 1+\alpha)/2\} = Pm\{(\theta 1+\alpha)/(2\theta 1)\}\{(\theta 1+\alpha)/\pi\}F \quad (18)$$

Thus, the total quantity of magnetic flux flowing through the entire magnetic pole of the rotor is given by the following expression (19);

$$\phi A = \{\phi(\theta 1 + \theta 3)/(2\theta 1)\} - Pm\{(\theta 1 + \theta 3)/(2\theta 1)\} \quad (19)$$

$$(F/\pi)(\theta 1 - \theta 3 + 2\alpha) + PH(F/\pi)[\{(\theta 1 + \theta 2)/2\} - \alpha)$$

In case that the control phase angle α in the expression (19) is positive or in case that the excitation phase switch position is advanced from the standard excitation phase switch position, the paragraph of the expression (19) involving the control phase angle α functions as the quantity of demagnetization and the quantity of magnetic flux flowing through the magnetic poles of the rotor decreases as the armature current increases.

In case that the control phase angle α in the expression (19) is negative or in case that the excitation phase switch position is delayed from the standard excitation phase switch position, the paragraph of the expression (19) involving the control phase angle α functions as the quantity of magnetization and the quantity of magnetic flux flowing through the magnetic poles of the rotor increases as the armature current increases.

With the rotary electric machine having the interpoles operated as the magneto generator, since the armature current reversely flows relative to the armature current when it is operated as the motor, the armature reaction magnetomotive force B is as shown in FIGS. 11 and 13 (B) and therefore the interpoles positioned on the delayed side relative to the corresponding respective main poles are magnetized so as to have the same polarity as the main poles whereby the respective main poles and the interpoles positioned on the delayed side serve as the single magnetic pole of the rotor.

The total quantity of magnetic flux φA flowing through the magnetic poles of the rotor is given by the following expression (20);

$$\phi A = \{\phi \times (\theta 1 + \theta 3)/(2\theta 1)\} - \{Pm(\theta 1 + \theta 3)/(2\theta 1)\} \quad (20)$$

$$(FG/\pi)(\theta 1 - \theta 3) + PH(FG/\pi)\{(\theta 1 + \theta 2)/2\}$$

In the invention, when the rotary electric machine is operated as the magneto generator, the inverter circuit 3 is so controlled that the control current flows from the battery 4 via the inverter circuit 3 through the armature coils Lu through Lw to generate the controlling magnetomotive force Bc as shown in FIG. 13(C). With the controlling magnetomotive force Bc generated in this manner when the rotary electric machine is operated as the generator, the phase when the controlling magnetomotive force Bc is generated causes the quantity of magnetic flux through the magnetic poles of the rotor to be controlled so as to adjust the output characteristics of the generator.

More particularly, when the rotary electric machine is operated as the magneto generator, as the control phase angle α is negative as shown in FIG. 13(C) and as the inverter circuit 3 is so controlled that the excitation phase of the armature coils is switched at the position adjacent to the interpoles or delayed by the predetermined phase angle α relative to the geometrical center position of the magnetic poles of the rotor or the standard excitation phase switch position thereof, the magnetization and the demagnetization due to the controlling magnetomotive force are balanced in the same manner as the magneto generator shown in FIG. 15. Thus, even though the control current from the battery through the armature coils increases or decreases, the output of the generator gets a neutral condition in which it has no change. The reason why the excitation phase switch position which is delayed relative to the standard excitation phase switch position can obtain such a neutral condition is that the interpole portion tends to be more influenced by the armature reaction than the main pole portion.

As the excitation phase switch position when the control current flows is furthermore delayed relative to the position when the neutral condition is obtained, since the quantity of magnetic flux flowing through the interpoles due to the controlling magnetomotive force increases, the total quantity of magnetic flux flowing through the magnetic poles of the rotor increases so that the output of the generator can increase.

Reversely, as the excitation phase switch position when the control current flows is advanced relative to the position when the neutral condition is obtained, since the quantity of magnetic flux flowing through the interpoles due to the controlling magnetomotive force decreases, the output of the generator can be controlled.

Thus, when the rotary electric machine is operated as the magneto generator after the internal combustion engine starts, the generator can begin to charge the battery from the range of low revolution of the engine because the output of the magneto generator increases by setting the control phase angle on the delayed side. On the other hand, when the engine rotates at high revolution, the battery can be prevented from being overcharged by controlling the output of the generator, which can be accomplished by setting the control phase angle on the advanced side.

Although the output of the generator having no interpole can be adjusted by generating the controlling magnetomotive force, the rotary electric machine having the interpoles can be more advantageously given more magnetic flux flowing through the portion of the interpoles due to the controlling magnetomotive force, which causes more control quantity of the output of the generator relative to the variation in the control current and facilitates the control of the generator output.

In accordance with the invention, since the rotary electric machine operated as the starter motor and the magneto generator is so constructed as to be provided with the interpoles, when the engine should start, the rotary electric machine can generate higher torque by using the magnetization effect caused by the armature reaction so that the engine can more easily start and can begin to charge the battery from the range of low revolutionn of the engine by widely increasing the generator output which is caused by more control current flowing from the battery via the inverter circuit through the armature coils. On the other hand, when the engine rotates at high revolution, the generator output can be controlled by adjusting the phase angle of the control current so as to prevent the battery from being overcharged.

Figure 3:
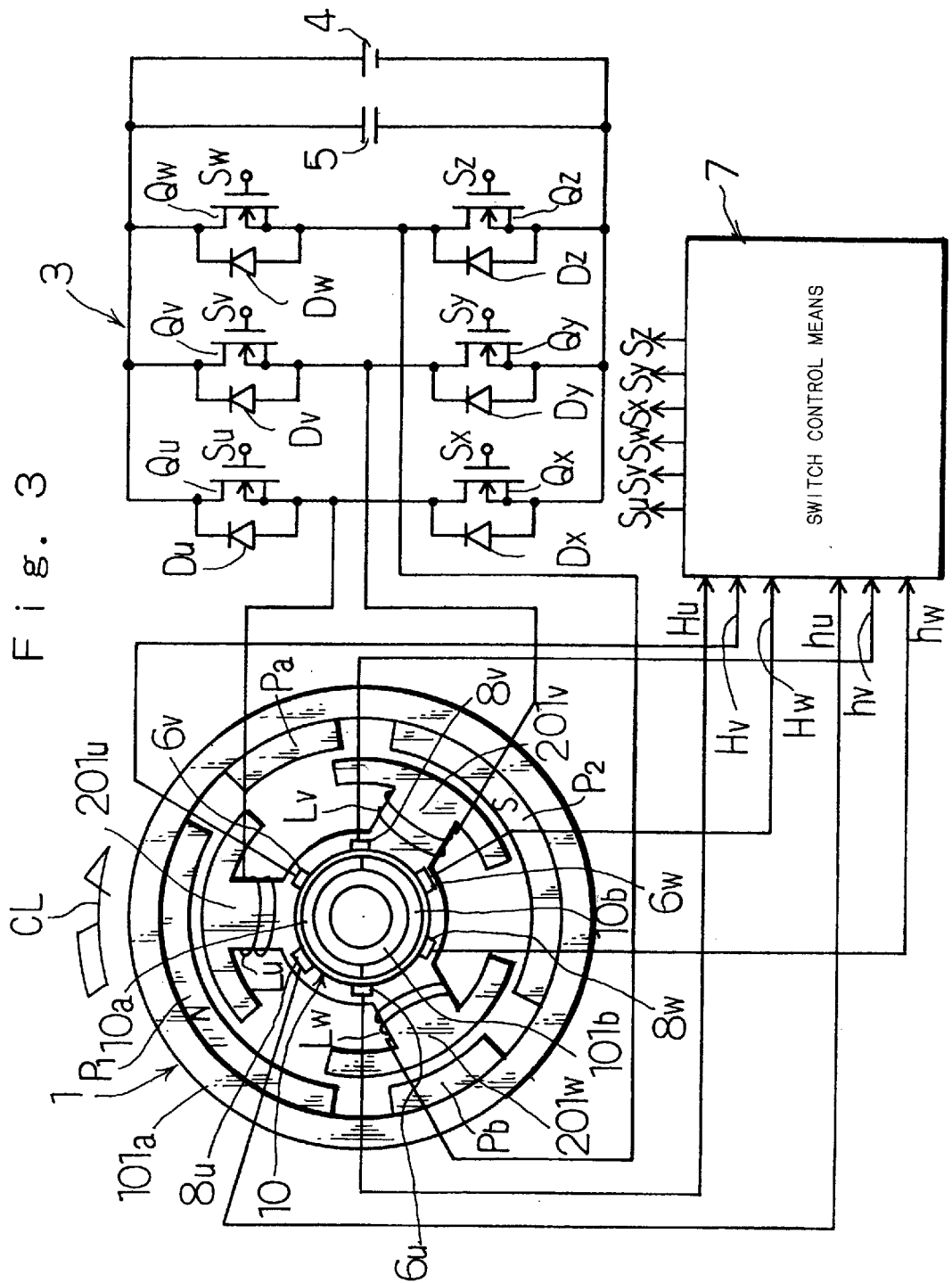
FIG. 3 is a schematic diagram of a starter generator constructed in accordance with another embodiment of the invention.
Figure 4:
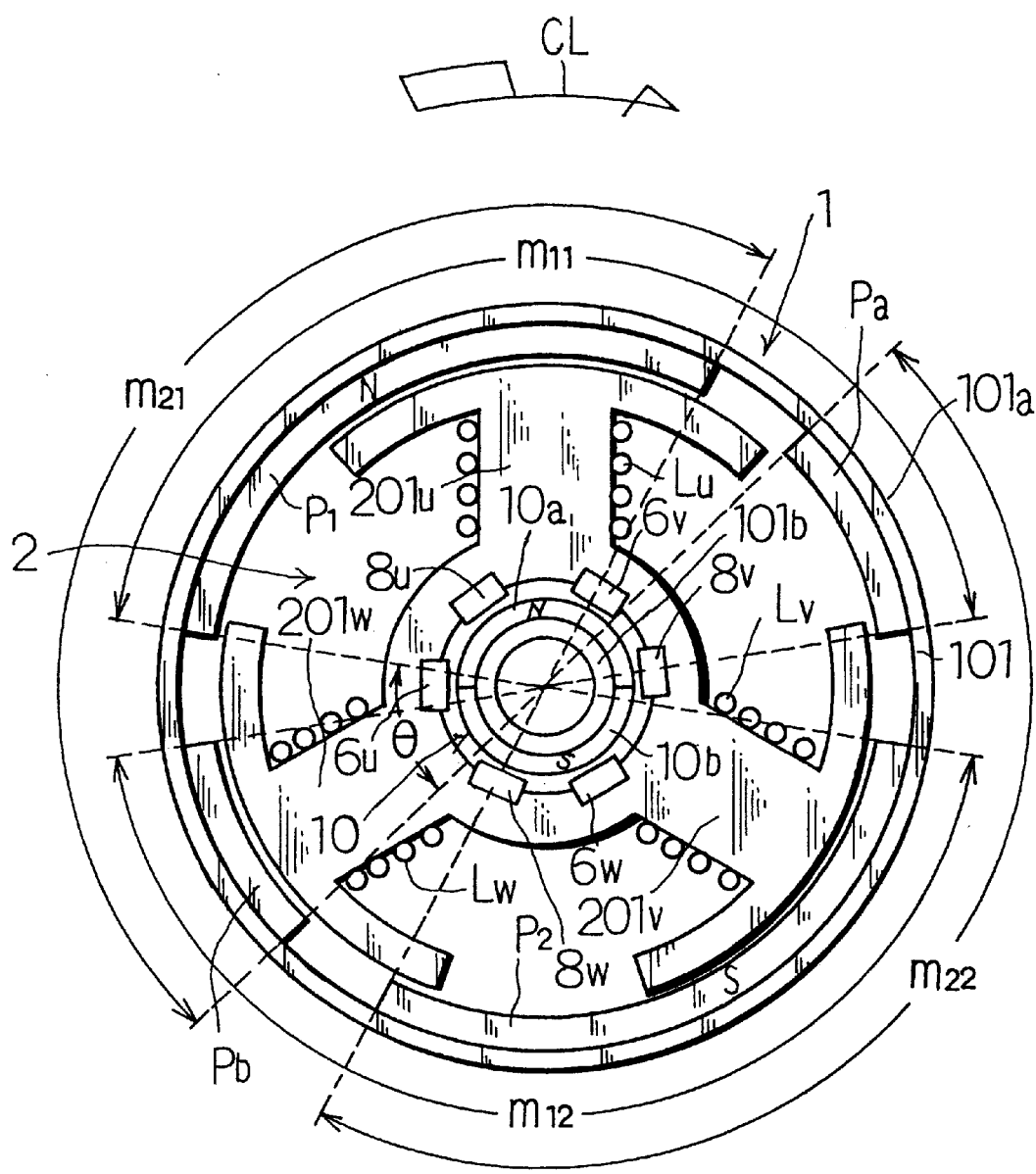
FIG. 4 is an enlarged front view of a gist portion of the starter generator of FIG. 3.

In FIG. 3 is illustrated another embodiment of the starter generator of the invention and in FIG. 4 is shown a construction of the main body of the starter generator. In this embodiment, on the inner peripheral face of the armature core 201 are mounted motor position detectors 6*u*, 6*v* and 6*w* for U, V and W phases generating motor position detection signals Hu, Hv and Hw for U, V and W phases by detecting the magnetic poles of the position detection magnets 10 and generator position detectors 8*u*, 8*v* and 8*w* for U, V and W phases generating generator position detection signals hu, hv and hw for U, V and W phases by detecting the magnetic poles of the position detection magnets 10. The motor position detection signals Hu, Hv and Hw and the generator position detection signals hu, hv and hw are input to the switch control means 7. The other construction of the rotary electric machine is substantially identical to that of the starter generator of FIG. 1. The generator position detectors 8*u*, 8*v* and 8*w* are. disposed in the positions delayed or disposed in a forward position in the rotational direction of the magnet rotor by the phase difference φ between the magnetic poles m11 and m12 for the motor rotor and the magnetic poles m21 and m22 for the generator rotor from the motor position detectors 6*u*, 6*v* and 6*w*, respectively.

In the embodiment illustrated in FIG. 1, the generator position detection signals are adapted to be obtained by the timers based on the motor position detection signals obtained from the motor position detectors 6*u*, 6*v* and 6*w* while, in the embodiment illustrated in FIG. 3, since the motor position detection signals and the generator position detection signals can be obtained directly from the motor position detectors 6*u*, 6*v* and 6*w* and the generator position detectors 8*u*, 8*v* and 8*w*, respectively, the generator output can be more precisely controlled by detecting the position of the magnet rotor without any delay when the generator output should be controlled.

In the illustrated embodiments, the armature coils are connected to each other so as to form the three phase circuit, but it should be understood that the invention may be applied to the starter generator in which the armature coils are connected to each other so as to form an n (n is an integral number of more than 2) phase circuit. In case that the armature coils are connected to each other in an n phase form, the number of the teeth of the armature core should be n×m (m is an integral number of more than 1) while the number of the poles of the magnet field should be 2×m.

In the illustrated embodiments, as the diodes Du through Dw and Dx through Dz to form the rectifier circuit section of the inverter circuit 3 may be parasitic diodes which are formed between the drain and source of the MOSFETs.

The switch elements forming the switch circuit of the inverter circuit 3 may be on-off controllable ones such as transistors, IGBTs (insulating gate type bipolar transistors) other than the MOSFETs.

Although, in the illustrated embodiments, the starter generator is operated as the brushless DC motor when the engine starts by making 180° switching control in which the current flows through the respective phase armature coils over the electrical angle of 90° before and behind the position where the non-load induction voltage induced by the armature coils reaches a peak when the drive current flows through the respective phase armature coils or where the magnetic flux flowing through the teeth on which the respective phase armature coils are wound passes the zero point, the invention is never limited to such 180° switching control. The invention may be applied to the starter generator adapted to be operated as the motor by making 120° switching control in which the current flows through the respective phase armature coils over the electrical angle of 60° before and behind the position where the non-load induction voltage induced by the armature coils reaches a peak when the drive current flows through the respective phase armature coils.

As aforementioned, in accordance with the invention, the rotary electric machine to be operated as the starter motor and also as the magneto generator is provided with the interpoles and when the engine should start, the rotary electric machine can generate higher torque by using the magnetization effect caused by the armature reaction so that the engine can more easily start and can begin to charge the battery from the range of low revolution of the engine by substantially increasing the generator output which is caused by more control current flowing from the battery via the inverter circuit through the armature coils. Furthermore, when the engine rotates at high revolution, the generator output can be controlled by adjusting the phase angle of the control current so as to prevent the battery from being overcharged.

Although some preferred embodiments have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A starter generator for an internal combustion engine operated as a starter motor when an internal combustion engine starts and as a magneto generator after said engine starts and comprising;

a magnet rotor provided on a crank shaft of said engine and having a magnet field including main poles of 2m (m is an integral number of more than one) circular arc-shaped permanent magnets having a predetermined polar arc angle and 2m interpoles of circular arc-shaped ferromagnetic material having a permeability higher than said permanent magnets for said main poles and having an polar arc angle smaller than said polar arc angle of said main poles and said main poles and said interpoles being alternately disposed in a peripheral direction so that each interpole is symmetrically disposed on both sides of each of said main poles;

a stator having an armature core with a plurality of teeth arranged in a peripheral direction and n (n is an integral number of more than two) phase armature coils of coil groups wound on said teeth of said armature core and connected to each other so as to form an n phase circuit so that leading ends of said teeth of said armature core form stator magnetic poles facing said the magnetic poles of said rotor;

an inverter circuit having a switch circuit of 2n on-off controllable switch elements connected to each other in an n phase bridge form and an n phase diode bridge full-wave rectifier circuit formed of 2n diodes connected to the 2n switch elements in a reversely parallel manner and a pair of DC side terminals of said full-wave rectifier circuit are connected to both terminals of a battery while $\underline{n}$ AC side terminals of said full-wave rectifier circuit are connected to $\underline{n}$ terminals led out from said $\underline{n}$ phase armature coils;

and an inverter controller to control said switch elements of said inverter circuit so that a drive current flows through said $\underline{n}$ phase armature coils so as to be transferred in a predetermined phase sequence from said battery via said switch elements of said inverter circuit when said internal combustion engine starts;

said starter generator adapted to supply a charging current to said battery through said full-wave rectifier circuit by an induction voltage from said $\underline{n}$ phase armature coils after said internal combustion engine starts.

2. A starter generator for an internal combustion engine operated as a starter motor when an internal combustion engine starts and as a magneto generator after said engine starts and comprising;

a magnet rotor provided on a crank shaft of said engine and having a magnet field including main poles of $2\underline{m}$ ($\underline{m}$ is an integral number of more than one) circular arc-shaped permanent magnets having a predetermined polar arc angle and $2\underline{m}$ interpoles of circular arc-shaped ferromagnetic material having a permeability higher than said permanent magnets for said main poles and having a polar arc angle smaller than said polar arc angle of said main poles and said main poles and said interpoles being alternately disposed in a peripheral direction so that each interpole is symmetrically disposed on both sides of each of said main poles;

a stator having an armature core with a plurality of teeth arranged in a peripheral direction and $\underline{n}$ ($\underline{n}$ is an integral number of more than two) phase armature coils of coil groups wound on said teeth of said armature core and connected to each other so as to form an $\underline{n}$ phase circuit so that leading ends of said teeth of said armature core form stator magnetic poles facing said the rotor poles;

an inverter circuit having a switch circuit of $2\underline{n}$ on-off controllable switch elements connected to each other in an $\underline{n}$ phase bridge form and an $\underline{n}$ phase diode bridge full-wave rectifier circuit formed of $2\underline{n}$ diodes connected to the $2\underline{n}$ switch elements in a reversely parallel manner and a pair of DC side terminals of said full-wave rectifier circuit are connected to both terminals of a battery while $\underline{n}$ AC side terminals of said full-wave rectifier circuit are connected to $\underline{n}$ terminals led out from said $\underline{n}$ phase armature coils;

and an inverter controller to control said switch elements of said inverter circuit so that a drive current flows through said $\underline{n}$ phase armature coils so as to be transferred in a predetermined phase sequence from said battery via said switch elements of said inverter circuit when said internal combustion engine starts;

said inverter controller serving to control said switch elements of said inverter circuit so that when said internal combustion engine starts, each of said main poles and adjacent one of said interpoles located on the side advanced relative to said one main pole in a rotational direction of said magnet rotor serve as one rotor pole for said motor whereby a drive current flows from said battery through said $\underline{n}$ phase armature coils via said inverter circuit in a predetermined phase sequence while an excitation phase of said n phase armature coils is switched at a motor standard excitation phase switch position set so as to have a relationship of a geometrical center position of said magnetic poles of said rotor for said motor and a geometrical center position of said stator magnetic poles at leading ends of said teeth of said armature core on which said respective phase armature coils are wound set relative to each other or at a motor excitation phase switch position having a predetermined control phase angle relative to said motor standard excitation phase switch position so as to rotate said magnet rotor in a direction in which said engine starts and also serving to control said switch elements of said inverter circuit so that after said internal combustion engine starts, each of said main poles and adjacent one of said interpoles located on the side delayed relative to said one main pole in a rotational direction of said magnet rotor serve as one rotor pole for said generator whereby a control current flows from said battery through said $\underline{n}$ phase armature coils via said inverter circuit in a predetermined phase sequence while an excitation phase of said $\underline{n}$ phase armature coils is switched at a generator standard excitation phase switch position set so as to have a relationship of a geometrical center position of said magnetic pole of the rotor for said generator and a geometrical center position of said stator magnetic poles at leading ends of said teeth of said armature core on which said respective phase armature coils are wound set relative to each other or at a generator excitation phase switch position having a predetermined control phase angle relative to said generator standard excitation phase switch position.

3. A starter generator for an internal combustion engine operated as a starter motor when an internal combustion engine starts and as a magneto generator after said engine starts and comprising;

a magnet rotor provided on a crank shaft of said engine and having a magnet field including main poles of $2\underline{m}$ ($\underline{m}$ is an integral number of more than one) circular arc-shaped permanent magnets having a predetermined polar arc angle and $2\underline{m}$ interpoles of circular arc-shaped ferromagnetic material having a permeability higher than said permanent magnets for said main poles and having a polar arc angle smaller than said polar arc angle of said main poles and said main poles and said interpoles being alternately disposed in a peripheral direction so that each interpole is symmetrically disposed on both sides of each of said main poles;

a stator having an armature core with a plurality of teeth arranged in a peripheral direction and $\underline{n}$ ($\underline{n}$ is an integral number of more than two) phase armature coils of coil groups wound on said teeth of said armature core and connected to each other so as to form an $\underline{n}$ phase circuit so that leading ends of said teeth of said armature core form stator magnetic poles facing said the rotor magnetic poles;

an inverter circuit having a switch circuit of $2\underline{n}$ on-off controllable switch elements connected to each other in an $\underline{n}$ phase bridge form and an n phase diode bridge full-wave rectifier circuit formed of $2\underline{n}$ diodes connected to the $2\underline{n}$ switch elements in a reversely parallel manner and a pair of DC side terminals of said full-wave rectifier circuit are connected to both terminals of a battery while $\underline{n}$ AC side terminals of said full-wave rectifier circuit are connected to $\underline{n}$ terminals led out from said $\underline{n}$ phase armature coils;

and an inverter controller to control said switch elements of said inverter circuit so that a drive current flows through said $\underline{n}$ phase armature coils while it is transferred in a predetermined phase sequence from said battery via said switch elements of said inverter circuit so as to rotate said magnet rotor in a direction in which said engine starts when said internal combustion engine starts;

said inverter controller comprising;

position detection means to detect as respective phase motor standard excitation phase switch position a position having a relationship of a geometrical center position of said magnetic poles of said rotor for said motor and a geometrical center position of said stator magnetic poles at leading ends of said teeth of said armature core on which said respective phase armature coils are wound set relative to each other while each of said main poles and adjacent one of said interpoles located on the side advanced relative to said one main pole in a rotational direction of said magnet rotor serve as one rotor pole for said motor when said internal combustion engine starts and to detect as respective phase generator standard excitation phase switch position a position having a relationship of a geometrical center position of said magnetic pole of said rotor for said generator and a geometrical center position of said stator magnetic poles at leading ends of said teeth of said armature core on which said respective phase armature coils are wound set relative to each other while each of said main poles and adjacent one of said interpoles located on the side delayed relative to said one main pole in a rotational direction of said magnet rotor serve as one rotor pole for said generator after said internal combustion engine starts whereby respective phase motor position detection signals including informations on said motor standard excitation phase switch position and respective phase generator position detection signals including informations on said generator standard excitation phase switch position are generated;

switch control means to give a drive signal to predetermined switch elements of said inverter circuit at said motor standard excitation phase switch position detected by said respective phase motor position detection signals or at said motor excitation phase switch position having a predetermined control phase angle relative to said motor standard excitation phase switch position so that a drive current of polarity necessary for rotating said magnet rotor in a direction in which said internal combustion engine starts when it should start flows from said battery via said switch elements of said inverter circuit through said armature coils and to give a drive signal to predetermined switch elements of said inverter circuit at said generator excitation phase switch position having a predetermined control phase angle relative to said generator standard excitation phase switch position detected by said generator position detection signals so that a characteristic of output current to output voltage of said armature coils is made a predetermined characteristics after said internal combustion engine starts.

4. A starter generator for an internal combustion engine as set forth in claim 2 or 3 and wherein said inverter controller is so constructed that said generator excitation phase switch position is one delayed relative to said generator standard excitation phase switch position so as to increase a magnetic flux flowing through portions of said interpoles when the output of said rotary electric machine operated as said magneto generator should be increased and that said generator excitation phase switch position is one advanced relative to said generator standard excitation phase switch position so as to decrease a magnetic flux flowing through portions of said interpoles when the output of said rotary electric machine operated as said magneto generator should be decreased.

* * * * *

UNITED STATES PATENT AND TRADEMARK OFFICE
CERTIFICATE OF CORRECTION

PATENT NO. : 6,278,194 B1
DATED : August 21, 2001
INVENTOR(S) : Nakagawa et al.

Page 1 of 1

It is certified that error appears in the above-identified patent and that said Letters Patent is hereby corrected as shown below:

Column 14,
Line 25, delete "timers 11u through 11u" and insert -- timers 11u through 11w --.

Column 20,
Line 55, delete "$\phi 2 = = \phi 2 = \phi \times (\theta 1+\alpha)/(2\theta 1) - \{Pm (\theta 1+\alpha)/(2\theta 1)\} \times \{(\theta 1+\alpha)/\pi\}F$" and insert -- $\phi 2 = \phi \times (\theta 1+\alpha)/(2\theta 1) - \{Pm (\theta 1+\alpha)/(2\theta 1)\} \times \{(\theta 1+\alpha)/\pi\}F$ --.

Signed and Sealed this

Twenty-sixth Day of March, 2002

Attest:

JAMES E. ROGAN
*Director of the United States Patent and Trademark Office*

*Attesting Officer*